3,449,330
AZOLE DERIVATIVES
Leonardo Guglielmetti, Basel, Erwin Maeder, Aesch, Basel-Land, Peter Liechti, Binningen, and Adolf Emil Siegrist, Basel, Switzerland, assignors to Ciba Limited, Basel, Switzerland, a Swiss company
No Drawing. Filed Aug. 16, 1965, Ser. No. 480,174
Claims priority, application Switzerland, Sept. 1, 1964, 11,400/64, 11,403/64
Int. Cl. C07d *85/48;* D06l *3/12*
U.S. Cl. 260—240                    17 Claims

ABSTRACT OF THE DISCLOSURE

New azole derivatives are provided which are represented by the formula

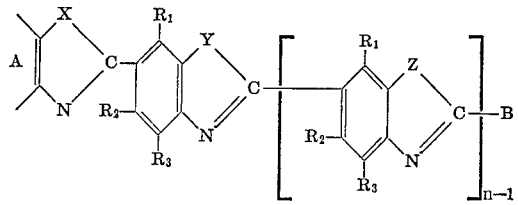

wherein A is a naphthalene, tetrahydronaphthalene or especially benzene residue condensed with the azole ring; B is an aryl or aralkenyl, or a heterocyclic residue which contains at least two conjugated double bonds in conjunction with the $>C=N$ double bond of the azole ring; $n$ is 1 or 2; $R_1$, $R_2$ and $R_3$ each represent hydrogen or a nonchromophoric substituent, and X, Y and Z each represents —O— or —NQ— where Q stands for a hydrogen atom or an alkyl, hydroxyalkyl, cyanoalkyl or alkenyl group or an aralkyl or aryl radical.

The compounds of this invention are useful as optical brighteners for organic materials.

---

The present invention provides valuable new azole derivatives of the general formula (1)
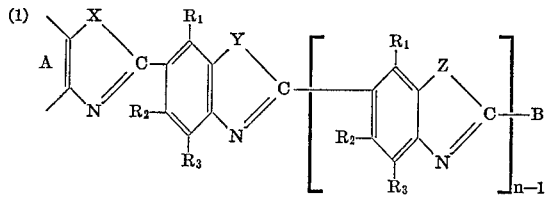

where A represents a naphthalene, tetrahydronaphthalene or especially benzene residue condensed with the azole ring in the manner indicated by the valency lines; B represents an aryl or aralkenyl radical or a heterocyclic residue, preferably one that contains only a single hetero ring, and this residue contains at least two conjugated double bonds in conjunction with the $>C=N$ double bond of the azole ring; $n=1$ or 2; $R_1$ to $R_3$ are identical or different and each represents a hydrogen atom or a nonchromophoric substituent, and X, Y and Z are identical or different and each represents —O— or —NQ— where Q stands for a hydrogen atom, or an alkyl, hydroxyalkyl, cyanoalkyl or alkenyl group or an aralkyl or aryl radical. X, Y and Z in the Formula 1 are advantageously identical and represent —O—.

From among these new azole derivatives of the Formula 1 there may be mentioned, for example, the benzoxazolyl compounds of the formula (2)
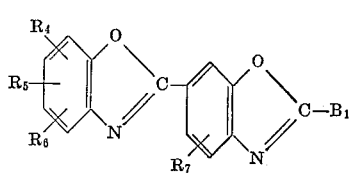

where $R_4$ and $R_5$ are identiial or different and each represents a hydrogen atom or a halogen atom such as fluorine, bromine or especially chlorine, or a linear or branched alkyl group containing up to 18 carbon atoms, such as methyl, ethyl, propyl, isopropyl, butyl, isobutyl, tertiary butyl, isoamyl, n-hexyl, n-octyl, 2-ethylhexyl, n-nonyl, n-dodecyl, n-octadecyl, or a residue of the formula (3a)  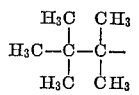

(3b)  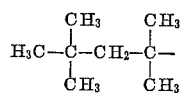

or a cycloalkyl group containing 5 or 6 cyclic members, especially cyclohexyl, a phenylalkyl group e.g. benzyl or cumyl, an aryl group e.g. phenyl, methylphenyl, chlorophenyl, methoxyphenyl, ethoxyphenyl, isopropoxyphenyl or n-octoxyphenyl, an alkenyl group, a hydroxylalkyl, alkoxyalkyl or halogenoalkyl group, a hydroxy group, an alkoxy group containing up to 18 carbon atoms e.g. methoxy, ethoxy, propoxy, isopropoxy, n-butoxy, isobutoxy, tertiary butoxy, amoxy, isoamoxy, hexoxy, octoxy, nonoxy or n-octadecoxy group, an aralkoxy group, a phenoxy group, e.g. phenoxy or chlorophenoxy group, a nitrile or cyanoalkyl group e.g. cyanoethyl, a carboxyl group, a carboxylic acid ester group containing up to 18 carbon atoms, e.g. carboxylic acid alkyl ester, alkoxyalkyl ester, alkenyl ester, aryl ester or aralkyl ester group, a carboxylic acid amide group which may be substituted by alkyl, aralkyl, cycloalkyl or aryl groups, a carboxylic acid hydrazide group, a carboxyalkyl or carbalkoxyalkyl group containing up to 12 carbon atoms e.g. carboxyethyl, carboxyisopropyl or carbomethoxyethyl, a sulphonic acid group, a sulphonic acid ester group containing up to 18 carbon atoms e.g. sulphonylalkyl or sulphonylaryl ester groups, a sulphonic acid amide group which contains up to 12 carbon atoms and may be substituted by alkyl or aryl groups, an alkylsulphone or arylsulphone group e.g. methylsulphone or phenylsulphone, or an amino group which may be substituted by alkyl, hydroxyalkyl or acyl residues, and $R_4$ and $R_5$ together with two vicinal carbon atoms of the benzene ring may form a six-membered alicycle; $R_6$ represents a hydrogen atom or a lower alkyl group containing 1 to 4 carbon atoms, and $R_7$ represents a hydrogen atom, a chlorine atom, a lower alkyl or alkoxy group containing up to 4 carbon atoms, and $B_1$ represents one of the residues (4a)  

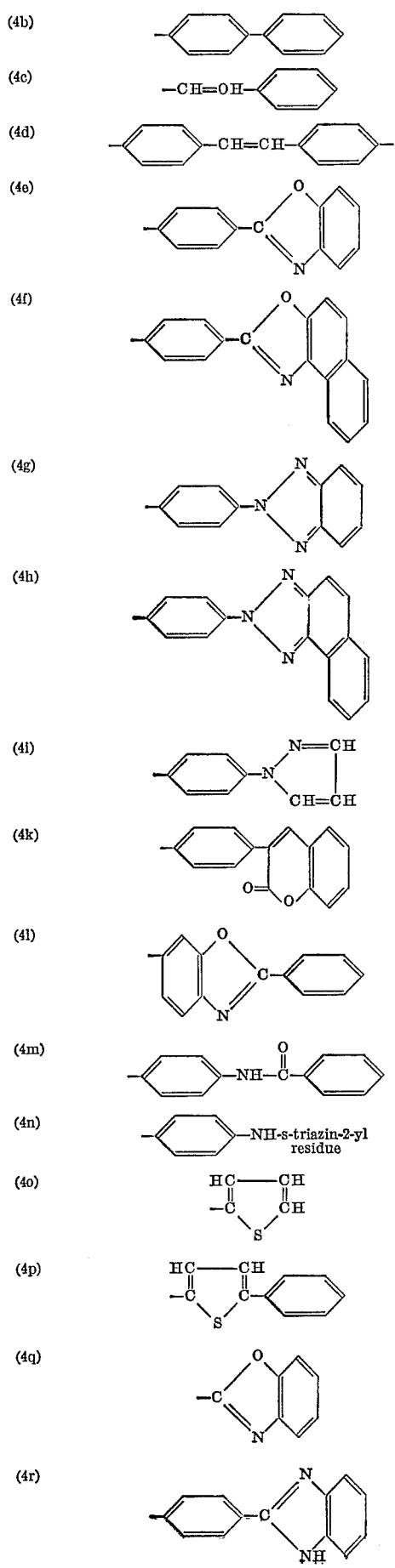
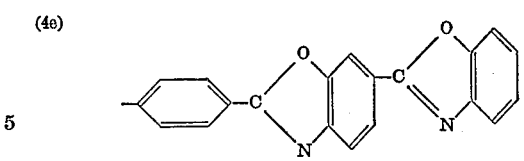
which may be substituted by monovalent non-chromophoric substituents.
From among the new benzoxyzolyl compounds of the Formula 2 there may be specially mentioned those which correspond to the formula
(5)
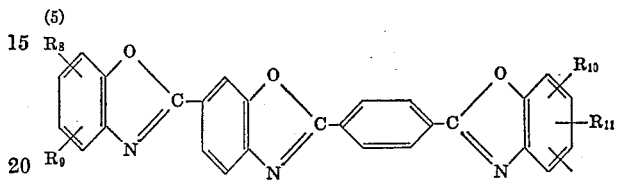
(6)
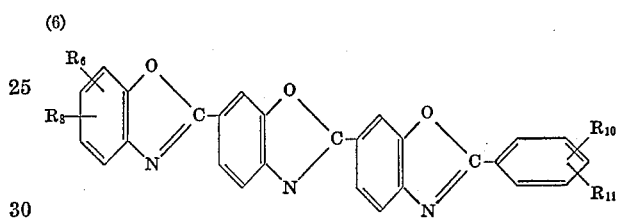
(7)
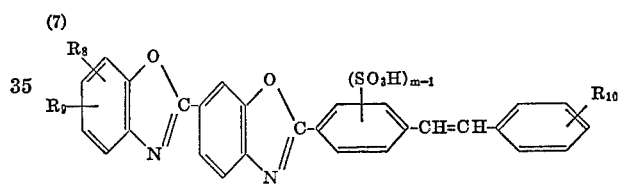
(8)
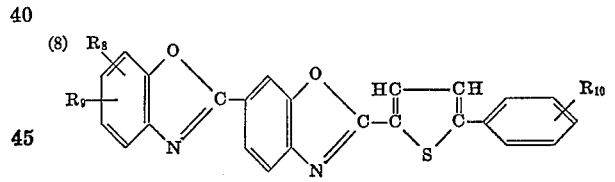
(9)
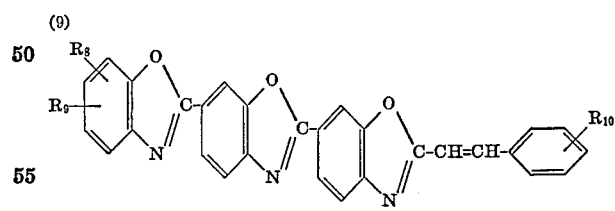
Furthermore, the compounds of the following formulae are of a certain value:
(10a)
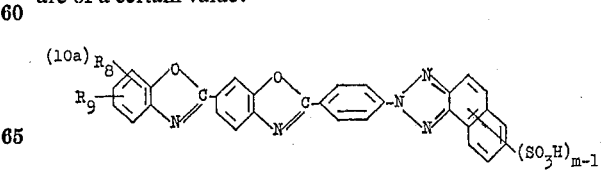
(10b)
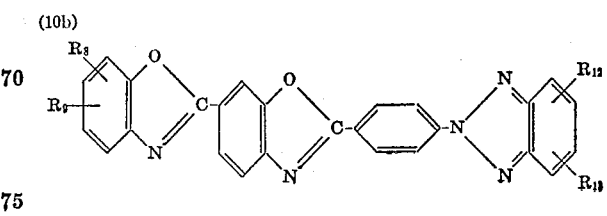

(11a)
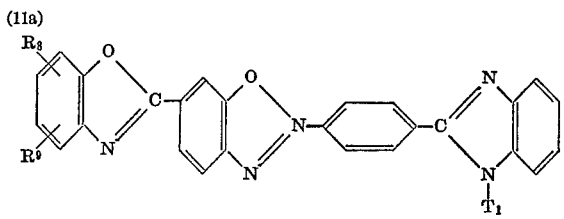

(11b)
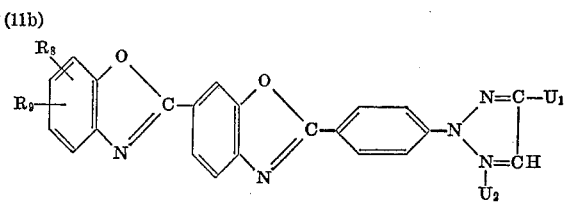

(12)
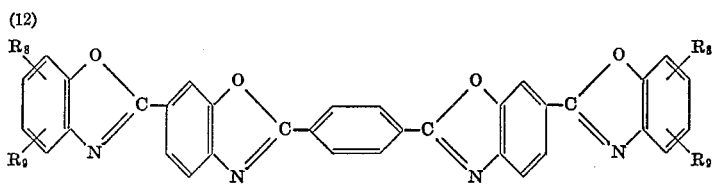

(13)
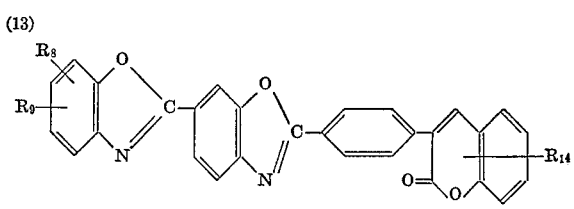

In the above Formulae 5 to 13 the symbols $R_8$ to $R_{11}$ are identical or different and each represents a hydrogen atom, a halogen atom, especially chlorine, an alkll or alkoxy group containing 1 to 12 carbon atoms, a phenyl or phenylalkyl group, a nitrile group, a free or neutralized carboxyl group (—COOcation), a carboxylic acid ester group, a carboxylic acid amide group, a free or neutralized sulphonic acid group (—SO₂Ocation) or a sulphonic acid amide group; $R_{12}$ represents a hydrogen atom, a methyl or methoxy group, $R_{13}$ a hydrogen or chlorine atom or a methoxy group and $R_{14}$ a hydrogen or chlorine atom, a methyl or methoxy group, and $T_1$ represents a hydrogen atom, an alkyl or cyanoalkyl group containing up to 4 carbon atoms; furthermore, $U_1$ and $U_2$ may be identical or different and each represent a hydrogen atom, a methyl or a phenyl group, and $m=1$ or 2.

The most important types of compounds covered by the above definition are those of the formula (2a)
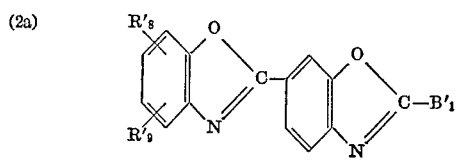

where $B_1'$ is one of the residues

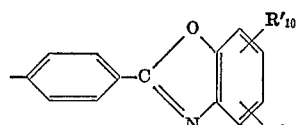

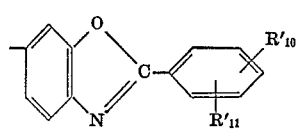

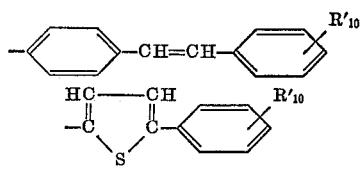

or

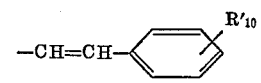

where $R_8'$ to $R_{11}'$ are identical or different and each represents a hydrogen or chlorine atom, an alkyl group containing 1 to 12 carbon atoms, a phenyl group, a tetrahydronaphthyl group, an alkylphenyl group in which the alkyl residue contains 1 to 4 carbon atoms, a phenylalkyl group in which the alkyl group contains 1 to 4 carbon atoms, a cyanoalkyl group containing 1 to 4 carbon atoms, a carboxylic acid group or carboxylic acid ester (preferably alkyl ester) group whose ester grouping contains 1 to 8 carbon atoms. In general, the substituents $R_8'$ to $R_{11}'$ are identical or, if they are different from one another, in each case the second substituent in the same benzene nucleus represents a hydrogen atom.

The new azole derivative of the general Formula 1 can be manufactured by various known methods.

According to a generally applicable manufacturing process e.g. an ortho-amino compound of the formula

(14)
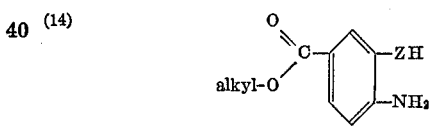

(where Z has the above meaning) is reacted with a carboxylic acid or a carboxylic acid halide, especially a carboxylic acid chloride of the formula

(15)

(where R represents the hydroxyl group or a halogen atom, especially chlorine, and B has the above meaning) according to the following scheme:

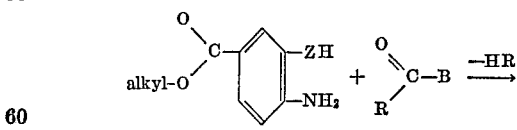

(16)
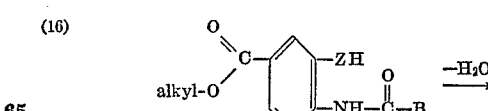

(17)
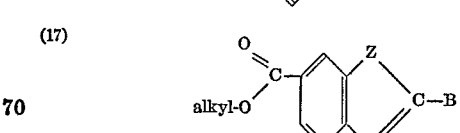

whereupon the alkyl ester group is hydrolyzed to the carboxyl group which latter may be converted into a carboxylic acid halide group, especially the carboxylic acid chloride group, and the resulting compound of the formula

(18) 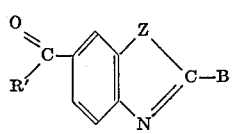

(where R' represents the hydroxyl group or a halogen atom, especially chlorine, and B and Z have the above meanings) is reacted with a further ortho-amino compound of the formula

(19) 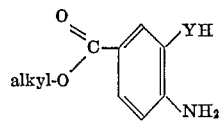

(where Y has the above meaning) according to the following scheme

(20) 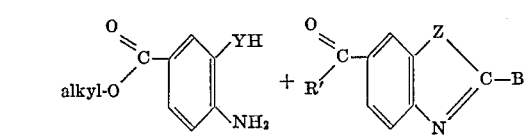

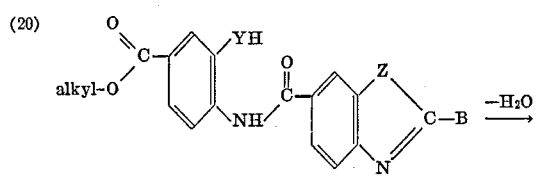

(21) 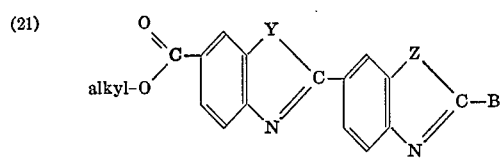

The alkyl ester group is then again hydrolyzed to the carboxyl group and the latter may be converted into a carboxylic acid halide group, especially the carboxylic acid chloride group, whereupon the resulting compound of the formula

(22) 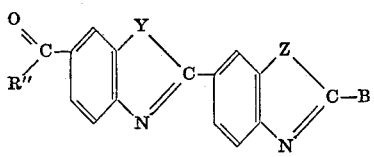

(where R" represents the hydroxyl group or a halogen atom, especially chlorine, and B, Y and Z have the above meanings) is reacted with a third ortho-amino compound of the formula

(23) 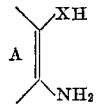

(where A and X have the above meanings) according to the following scheme

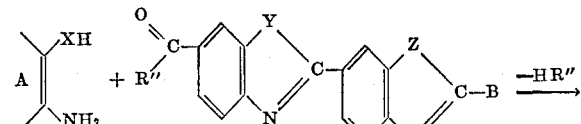

(24) 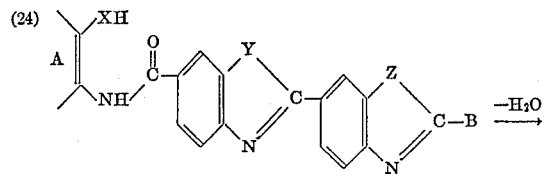

(25) 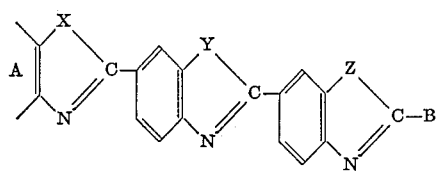

where A, B, X, Y and Z have the above meanings.

The reaction of the components of the Formulae 14 and 15, 18 and 19 and 22 and 23 can be performed with or without intermediate isolation of the first formed amides of the formulae 16, 20 and 24 respectively by heating at elevated temperatures, for example at 120 to 350° C., advantageously in an inert gas, e.g. in a current of nitrogen, if desired in the presence of a catalyst. Suitable catalysts are, for example, boric acid, boric anhydride, zinc chloride, para-toluenesulphonic acid, also polyphosphoric acids including pyrophosphoric acid. If the catalyst used is boric acid, it is advantageously used in an amount of 0.5 to 5% of the weight of the reaction mixture as a whole. It is also possible to use additionally high-boiling, polar organic solvents, for example dimethylformamide, dichlorobenzene, trichlorobenzene or aliphatic, if desired etherified, hydroxy compounds e.g. propyleneglycol, ethyleneglycol monoethyl ether or diethyleneglycol diethyl ether or high-boiling phthalic acid esters e.g. phthalic acid dibutyl ester.

However, it is more advantageous to perform the present process in two stages by first condensing the carboxylic acid halides, especially the carboxylic acid chlorides of the Formula 15, 18 or 22 with the ortho-amino compounds of the Formula 14, 19 or 23 respectively in the presence of an organic solvent such as toluene, a xylene, chlorobenzene, trichlorobenzene or nitrobenzene, at a temperature of 100 to 200°, whereupon the resulting acyl compounds of the Formula 16, 20 or 24 respectively are converted into the azole derivatives at a temperature from 150 to 350° C., if desired or required in the presence of a catalyst. When the starting material used is a carboxylic acid chloride, it may be prepared immediately before the condensation with the orthoamino compound and without isolation from the free carboxylic acid and thionylchloride, if desired or required, with addition of a catalyst such as pyridine, in the solvent in which subsequently the condensation is carried out.

The benzoxazolyl compound of the Formula 5, in which $R_8$ to $R_{11}$ have the above meanings and $R_8$ may be the same as $R_{10}$ and $R_9$ the same as $R_{11}$, can be prepared under the reaction conditions described above, for example according to the following scheme:

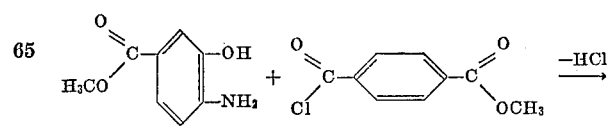

(26) 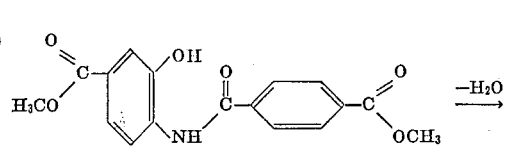

(27) 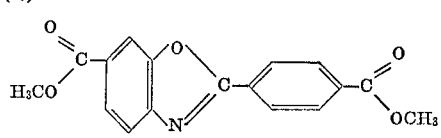 (1) hydrolysis / (2) SOCl₂ →
(35) 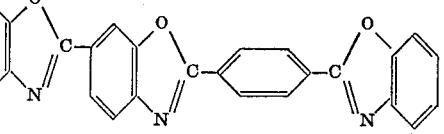
(28) 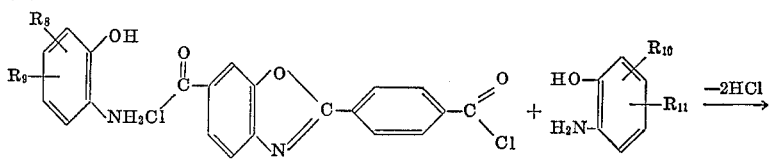 −2HCl →
(29) 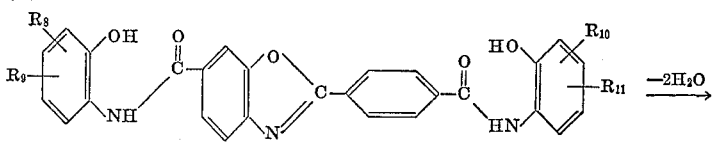 −2H₂O →
(30) 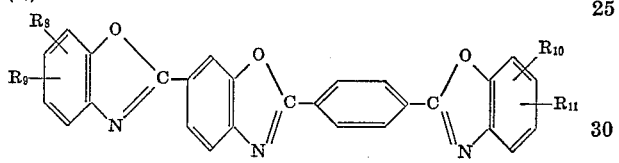
As examples of new azole derivatives of the Formula 1 or 2, obtained by the processes described above, there may be mentioned:
(31) 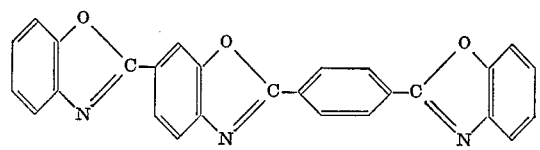
(36) 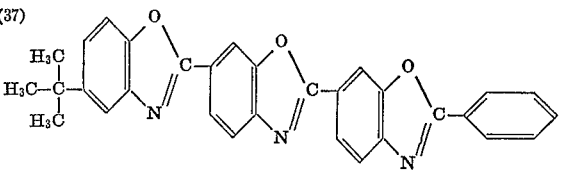
(37) 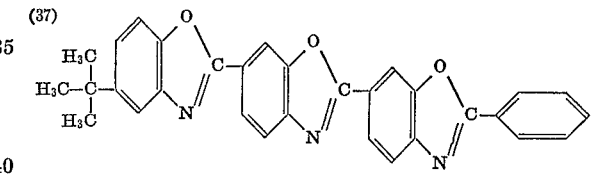
If desired, the azole derivatives of the Formulae 1 and 2 obtained by the processes described above may be
(32) 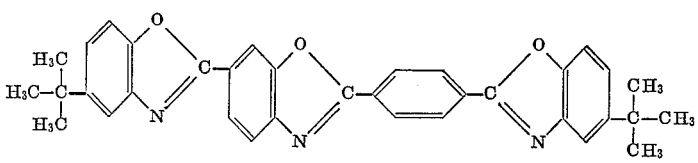
(33) 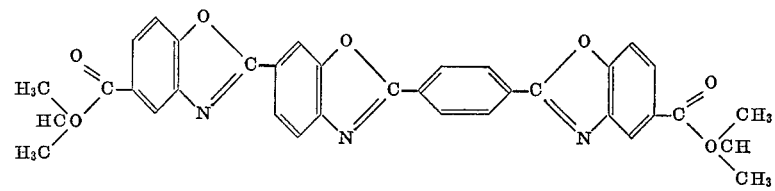
(34) 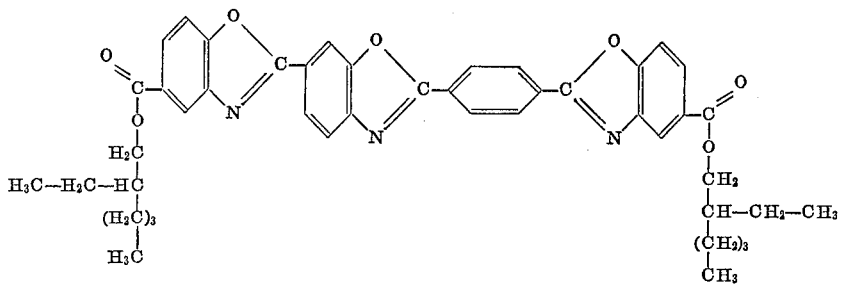

subjected to further reactions. Thus, water-soluble derivatives are obtained when:

(a) The azole derivatives of the Formulae 1 and 2 are sulphonated, e.g. with sulphuric acid monohydrate, chlorosulphonic acid or with sulphuric acid containing sulphur trioxide, if desired at an elevated temperature, and the sulphonic acid group is then converted with an organic or preferably an inorganic base into the corresponding salts;

(b) One or several primary or secondary amino groups of the azole derivatives of the Formulae 1 and 2 are converted with sultones, e.g. with propanesultone or butanesultone at an elevated temperature into the corresponding alkylsulphonic acid derivatives;

(c) One or several primary amino groups of the azole derivatives of the Formulae 1 and 2 are converted with aldehyde-bisulphite compounds e.g. with formaldehyde-alkali metal bisulphite, into the corresponding ω-methanesulphonic acid derivatives;

(d) One or several primary amino groups of the azole derivatives of the Formulae 1 and 2 are reacted with alkylsulphonic or aralkylsulphonic acids e.g. bromoethanesulphonic acid or benzylchloride-sulphonic acid;

(e) One or several primary or secondary amino groups or hydroxyl groups of the azole derivatives of the Formulae 1 and 2 are linked through s-triazin-2-yl bridges with phenolsulphonic acids or anilinesulphonic acids;

(f) In one or several hydroxyl groups of the azole derivatives of the Formulae 1 and 2 a polyalkylene ether chain, sufficiently long the produce solubility in water, is introduced by means of an alkylene oxide such as ethylene oxide or propylene oxide or with a polyalkylene ether monohalide;

(g) One or several groups capable of quaternation present in the azole derivatives of the Formulae 1 and 2 are reacted with quaternating agents e.g. methyliodide, dimethylsulphate, benzylchloride or toluenesulphonic acid alkyl esters in the acid, if necessary under superatmospheric pressure;

(h) On or several halogenoalkyl groups of the azole derivatives of the Formulae 1 and 2 are converted into the corresponding quaternary derivatives with tertiary bases e.g. pyridine.

The new optical brighteners of the composition defined above display in the dissolved or finely dispersed state a more or less pronounced fluorescence. They may be used for optically brightening a wide variety of organic materials of high or low molecular weight or materials containing organic substances.

As relevant examples the following groups of organic materials suitable for optical brightening may be mentioned, without thereby in any way restricting the possible scope:

I. Synthetic organic materials of high or higher molecular weight:

(a) Polymers based on organic compounds containing at least one polymerizable carbon-to-carbon double bond, i.e. their homopolymers and copolymers and products obtained by after-treating them, such as cross-linked, grafted or decomposition products, polymer dilutions or the like; relevant examples are:

Polymers based on $\alpha,\beta$-unsaturated carboxylic acids, especially of acryl compounds (e.g. acrylic esters, acrylic acids, acrylonitrile, acrylamides and their derivatives or their methacrylic analogues), of olefinic hydrocarbons (e.g. ethylene, propylene, isobutylene, styrenes, dienes, especially butadiene, isoprene i.e., also rubbers and rubber-like polymers; furthermore so-called ABS polymers), polymers based on vinyl and vinylidene compounds (e.g. vinyl esters, vinylchloride, vinylsulphonic acid, vinyl ethers, vinyl alcohol, vinylidenechloride, vinylcarbazole), of halogenated hydrocarbons (chloroprene, highly halogenated ethylenes), of unsaturated aldehydes and ketones (e.g. acrolein or the like), of allyl compounds or the like, graft polymerization products (e.g. by grafting vinylic monomers), cross-linked products (e.g. by means of bifunctional or polyfunctional cross-linking agents such as divinylbenzene, polyfunctional allyl compounds or bisacryl compounds, or products accessible by partial decomposition (hydrolysis, depolymerization) or modification of reactive groupings (e.g. esterification, etherification, halogenation, auto-crosslinking).

(b) Other polymers accessible, for example, by ring opening e.g. polyamides of the polycaprolactam type; furthermore formaldehyde polymers or polymers accessible by polyaddition as well as by polycondensation, such as polyethers, polythioethers, polyacetals and thioplasts, (c) Polycondensation products or precondensates based on bifunctional or polyfunctional compounds containing condensable grups, their homo- and co-condensates and products obtained by after-treating them; relevant examples are:

Polyesters, saturated (e.g. polyethylene terephthalate) or unsaturated (e.g. maleic acid-dialcohol poly-condensates and their cross-linked products with polymerizable vinyl monomers), linear or branched (also those based on polyhydric alcohols e.g. alkyd resins).

Polyamides (e.g. hexamethylenediamine adipate) maleinate resins, melamine resins, phenolic resins (novolaks), aniline resins, furan resins, carbamide resins and their precondensates, and similarly constituted products, polycarbonates, silicone resins and others.

(d) Polyadducts such as polyurethanes (if desired cross-linked), epoxy resins.

II. Semisynthetic organic materials e.g. cellulose esters or mixed esters (acetate, propionate, nitrocellulose, cellulose ethers), regenerated cellulose (viscone, cuprammonium cellulose) or products obtained by after-treating them, casein plastics.

III. Natural organic materials or animal or vegetable origin, e.g. based on cellulose or proteins such as wool, cotton, silk, bast, jute, hemp, furs and hairs, leathers, finely dispersed wood masses, natural resins (such as colophony, especially lacquer resins); furthermore rubber, gutta percha, balata and products obtained by after-treating or modifying them (e.g. by curing, cross-linking or grafting), decomposition products (e.g. by hydrolysis, depolymerization), products accessible by conversion of reactive groups (e.g. by acylation, halogenation, cross-linking or the like).

The organic materials that can be optically brightened may be at any stage of their processing (raw materials, semi-finished products or finished articles) and physical states. They may be in the form of structures of any desired shape, that is to say, for example, they may be predominantly three dimensional bodies such as blocks, plates, sections, pipes, injection mouldings or components of any desired kind, chips or granulates, foamed articles; predominantly two-dimensional bodies such as films, foils, lacquers, tapes, coatings, impregnations or coatings; or predominantly unidimensional bodies such as filaments, fibres, flocks, bristles or wires. The said materials may also be as yet not shaped and be in the most varied homogeneous and inhomogeneous forms of dispersion and physical states, for example in the form of powders, solutions, emulsions, dispersions, latices (e.g. lacquer solutions, polymer dispersions), sols, gels, putties, pastes, waxes, adhesives, pore fillers or the like.

Fibrous materials may, for example, take the form of monofils, staple fibres, flocks, hanks, textile threads, yarns, doubled yarns, fibre fleeces, felts, cottonwool, flocculated products or of textile fabrics or textile laminates, knitwear, of papers, cardboards, paper pulps or the like.

The compounds to be used according to this invention are of special value for the treatment of textile organic materials, especially woven textile fabrics. If fibres—which may be staple fibres or monofils, in the form of hanks, woven or knitted fabrics, fleeces, flocculated substrates or laminates—are to be optically brightened by the present process, this is advantageously done in an aqueous medium in which the chosen compound is finely dispersed (suspended or, if desired, dissolved). If desired, there may be added to the treatment liquor a dispersant, for example soaps, polyglycol ethers of fatty alcohols, fatty amines or alkylphenols, cellulose sulphite waste liquor or condensation products of (possibly alkylated) naphthalenesulphonic acids with formaldehyde. It has been found particularly advantageous to work in a neutral, weakly alkaline or acid bath. Likewise, it is advantageous to perform the treatment at a temperature from about 50 to 100° C., for example at the boiling temperature of the bath or in its vicinity (at about 90° C.). The improving treatment according to this invention may also be carried out with solutions in organic solvents.

Furthermore, the new optical brighteners to be used in this invention may be added to, or incorporated with, the materials before or during their shaping. Thus, for example, in the manufacture of foils, films, tapes or mouldings they may be added to the moulding or injection moulding composition or they may be dissolved, dispersed or in any other way finely distributed in the spinning mass before spinning. The optical brighteners may also be added to the starting materials, reaction mixtures or intermediate products to produce fully synthetic or semi-synthetic organic materials, that is to say before or during the chemical reaction, e.g., a polycondensation (including the precondensates), a polymerization (including the prepolymers) or a polyaddition.

The new optical brighteners can, of course, also be used whenever organic materials of the kind indicated above are combined in any desired manner with inorganic materials in any desired form (typical examples: detergents, white pigments in organic substances).

The new optical brighteners are distinguished by their particularly good heat resistance and fastness to light and to migration.

The amount of optical brightener to be used according to this invention, referred to the weight of the material to be optically brightened, may vary within wide limits. Even very small amounts, in some cases for instance as little as 0.001% by weight, may suffice to produce a distinct and durable effect, though it is also possible to use amounts of up to about 0.5% by weight or more. For most practical purpose an amount ranging from 0.01 to 0.2% by weight will be preferred.

The new compounds, to be used as brightening agents, may also be applied, for example, as follows:

(a) In admixture with dyestuffs or pigments or as additives to dyebaths, printing, discharge or reserve pastes. Also for after-treating dyeings, prints or discharge prints.

(b) In admixture with so-called "carriers," anti-oxidants, light filters, heat stabilizers, chemical bleaches or as additives to bleaching baths.

(c) In admixture with cross-linking agents, dressings such as starch or synthetic dressings. It may be of advantage to add the products of this invention to the liquors used for producing an anti-crease finish.

(d) In combination with detergents. The detergent and the optical brightener may be added separately to the washing liquor. It is also advantageous to use detergents that as such already contain a share of brightening agent. Suitable detergents are, e.g., soaps, salts of sulphonate washing agents, e.g., of sulphonated benzimidazoles substituted on the carbon atom 2 by higher alkyl radicals, also salts of monocarboxylic acid esters of 4-sulphophthalic acid with higher fatty alcohols, also salts of fatty alcohol sulphonates, alkylarylsulphonic acids or condensation products of higher fatty acids with aliphatic hydroxysulphonic or aminosulphonic acids. Furthermore, there may be used non-ionic detergents, e.g., polyglycol ethers derived from ethylene oxide and higher fatty alcohols, alkylphenols or fatty amines.

(e) In combination with polymeric vehicles (polymers, polycondensates or polyadducts) in which the brightening agent, if desired in addition to other substances, is incorporated in the dissolved or dispersed form, for example, in the case of coating, impregnating or binding agents (solutions, dispersions, emulsions) for textile materials, fleeces, papers or leathers.

(f) As additives to a wide variety of industrial products to improve their presentation or to obviate disadvantages in their usefulness, for example, as additives to glues, adhesives, paints or the like.

The compounds of the above formulae can be used as scintillators for various photographic purposes, such as for electrophotographic reproduction or for super-sensitizing.

If the brightening operation is to be combined with other treating or improving operations, the combined treatment is advantageously performed with the use of a suitable stable preparation which contains in addition to optically brightening compounds of the above formulae also dispersants, detergents, carriers, dyestuffs, pigments or dressing agents.

When treating polyester fibres with the brighteners of this invention it is advantageous to impregnate these fibers with an aqueous dispersion of the brightener at a temperature below 75° C., e.g., at room temperature, and then to subject it to a dry heat treatment at a temperature above 100° C. In general, it is of advantage first to dry the impregnated material at a moderately raised temperature, e.g., at a temperature from at least 60° C. to about 100° C. The dry heat treatment is then advantageously carried out at 120 to 250° C., for example, by heating in a drying chamber, by ironing within the indicated temperature range or by treatment with dry, super-heated steam. If desired, the drying and the dry heat treatment may follow immediately upon each other or they may be performed in a single stage.

Unless otherwise indicated, parts and percentages in the following examples are by weight.

Example 1

8 parts of the dicarboxylic acid dichloride of the formula (38)

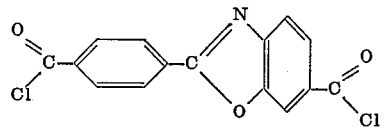

are stirred with 5.4 parts of ortho-aminophenol and 1 part by volume of pyridine in 150 parts by volume of anhydrous ortho-dichlorobenzene. The reaction mixture is slowly heated to the reflux temperature, during which at 140 to 150° C. strong evolution of hydrochloric gas takes place. After three hours' refluxing the solvent is slowly evaporated under nitrogen, and a dark melt is obtained which is still diluted with solvent. The batch is then mixed with 100 parts by volume of dibutylphthalate and 1 part of boric anhydride, rapidly heated to 300° C. and further stirred for 15 minutes at this temperature, during which water escapes and a dark solution forms which is cooled to 100° C., and 200 parts by volume of methanol are run into the thickly liquid suspension. The mixture is suctioned at room temperature and rinsed with methanol. After drying, there are obtained about 9.5 parts (=89% of theory) of the compound of the formula (39)

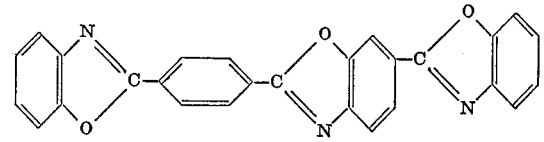

in the form of a light-yellow powder which melts at 290 to 308° C. After two recrystallizations from ortho-dichlorobenzene with the aid of active carbon and bleaching earth there are obtained very fine, light-yellow crystals melting at 332 to 335° C. which display a strong fluorescence in ultraviolet light.

*Analysis.*—$C_{27}H_{15}O_3N_3$ (mol. weight 429.44). Calculated: C, 75.52%; H, 3.52%; N, 9.79%. Found: C, 75.90%; H, 3.69%; N, 9.53%.

In an analogous manner the corresponding aminophenols yield the following compounds (40)

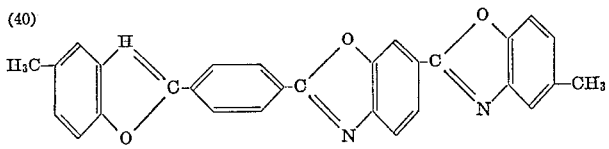

Light-yellow, finely crystalline powder from dimethylformamide, melting at 277 to 279° C.

*Analysis.*—$C_{29}H_{19}N_3O_3$ (mol. weight 457.46). Calculated: C, 76.13%; H, 4.19%; N, 9.19%. Found: C, 76.30%; H, 4.45%; N, 8.98%.

(41)

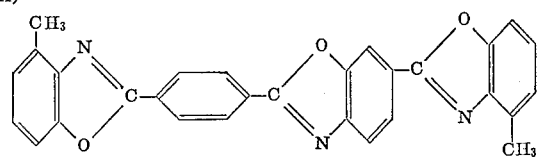

Light-yellow, finely crystalline powder from ortho-dichlorobenzene, melting at 324 to 325° C.

*Analysis.*—$C_{29}H_{19}N_3O_3$ (mol. weight 457.46). Calculated: C, 76.13%; H, 4.19%; N, 9.19%. Found: C, 75.81%; H, 4.27%; N, 9.33%.

(42)

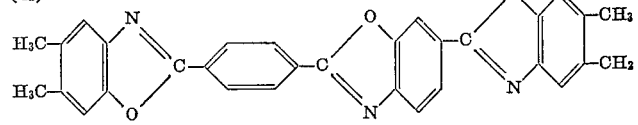

Light-yellow, finely crystalline powder from ortho-dichlorobenzene, melting at 357 to 360° C.

*Analysis.*—$C_{31}H_{23}N_3O_3$ (mol. weight 485.51). Calculated: C, 76.68%; H, 4.78%; N, 8.66%. Found: C, 76.36%; H, 4.80%; N, 8.46%.

(43)

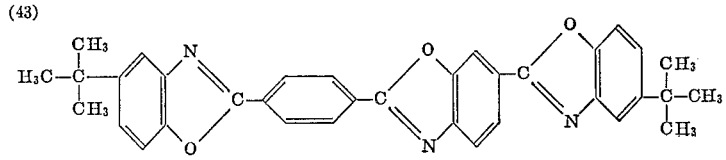

Fine, yellowish needles from dimethylformamide, melting at 304 to 306° C.

*Analysis.*—$C_{35}H_{31}N_3O_3$ (mol. weight 541.62). Calculated: C, 77.61%; H, 5.77%; N, 7.76%. Found: C, 77.60%; H, 5.76%; N, 7.86%.

(44)

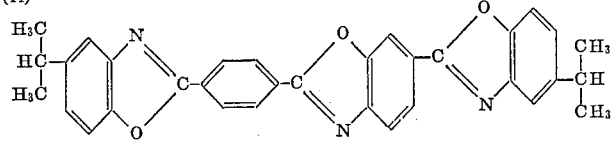

Light-yellow, finely crystalline powder from chlorobenzene, melting at 265 to 267° C.

*Analysis.*—$C_{33}H_{27}N_3O_3$ (mol. weight 523.57). Calculated: C, 77.17%; H, 5.30%; N, 8.18%. Found: C, 77.45%; H, 5.24%; N, 8.10%.

(45)

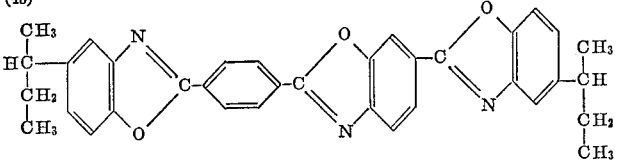

Light-yellow, finely crystalline powder from chlorobenzene, melting at 227 to 228° C.

*Analysis.*—$C_{35}H_{31}N_3O_3$ (mol. weight 541.63). Calculated: C, 77.61%; H, 5.77%; N, 7.76%. Found: C, 77.65%; H, 5.75%; N, 7.86%.

(46)

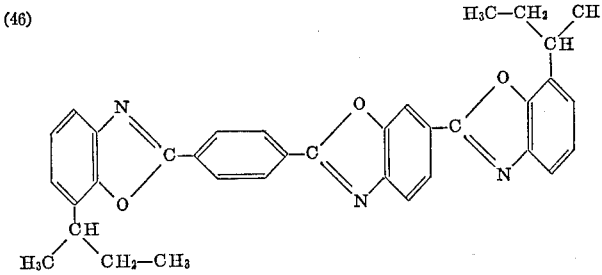

Small, light-yellow needles from chlorobenzene, melting at 227 to 228° C.

*Analysis.*—C$_{35}$H$_{31}$N$_{3}$O$_{3}$ (mol. weight 541.63). Calculated: C, 77.61%; H, 5.77%; N, 7.76%. Found: C, 77.57%; H, 5.75%; N, 7.73%.

(47)

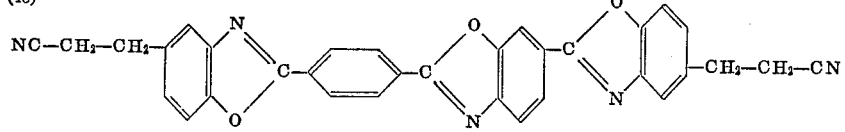

Light-yellow, finely crystalline powder from dioxane, melting at 284 to 285° C.

*Analysis.*—C$_{43}$H$_{47}$O$_{3}$N$_{3}$ (mol. weight 653.83). Calculated: C, 78.99%; H, 7.25%; N, 6.43%. Found: C, 78.86%; H, 7.05%; N, 6.66%.

(48)

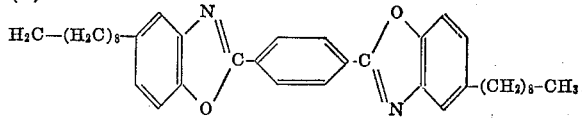

Yellowish, small needles from trichlorobenzene, melting at 322 to 324° C.

*Analysis.*—C$_{33}$H$_{21}$N$_{5}$O$_{3}$ (mol. weight 535.54). Calculated: C, 74.01%; H, 3.95%; N, 13.08%. Found: C, 73.15%; H, 3.92%; N, 12.30%.

(49)

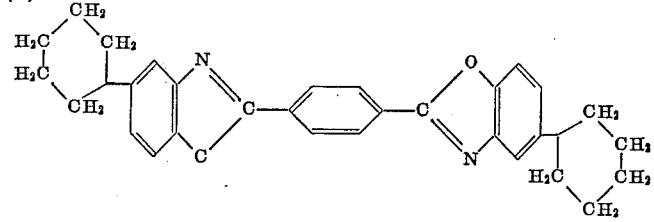

Light-yellow, finely crystalline powder from chlorobenzene, melting at 198 to 202° C.

*Analysis.*—C$_{45}$H$_{51}$N$_{3}$O$_{3}$ (mol. weight 681.88). Calculated: C, 79.26%; H, 7.54%; N, 6.16%. Found: C, 79.15%; H, 7.41%; N, 6.43%.

(50)

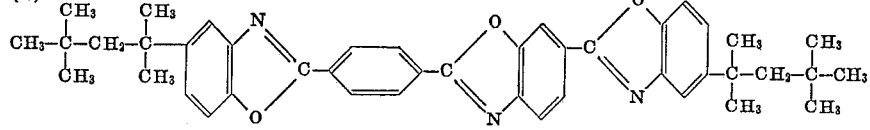

Greenish-light yellow crystalline powder from trichlorobenzene, melting above 360° C.

*Analysis.*—C$_{27}$H$_{13}$N$_{3}$O$_{3}$Cl$_{2}$ (mol. weight 498.30). Calculated: C, 65.08%; H, 2.63%; N, 8.43%; Cl, 14.23%. Found: C, 64.77%; H, 2.55%; N, 8.15%; Cl, 14.06%.

(51)

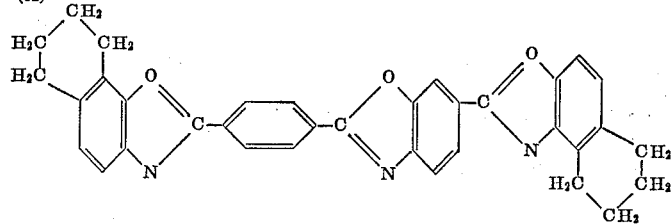

Light-yellow, finely crystalline powder from ortho-dichlorobenzene, melting at 320 to 325° C.

*Analysis.*—C$_{39}$H$_{35}$N$_{3}$O$_{3}$ (mol. weight 593.70). Calculated: C, 78.89%; H, 5.94%; N, 7.08%. Found: C, 78.68%; H, 5.90%; N, 7.09%.

(52)

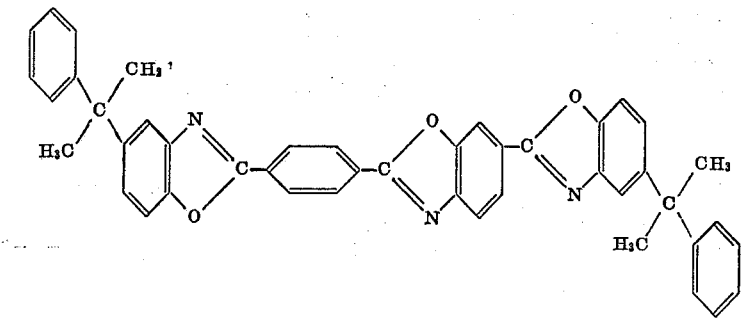

Fine, light-yellow needles from chlorobenzene, melting at 295 to 297° C.

*Analysis.*—C$_{35}$H$_{27}$N$_{3}$O$_{3}$ (mol. weight 537.59). Calculated: C, 78.19%; H, 5.06%; N, 7.28%. Found: C, 78.41%; H, 5.16%; N, 7.68%.

(53)

Fine, light-yellow needles from xylene, melting at 267 to 268° C.

*Analysis.*—$C_{45}H_{35}O_3N_3$ (mol. weight 665.79). Calculated: C, 81.18%; H, 5.30%; N, 6.31%. Found: C, 81.47%; H, 5.36%; N, 6.45%.

(54)

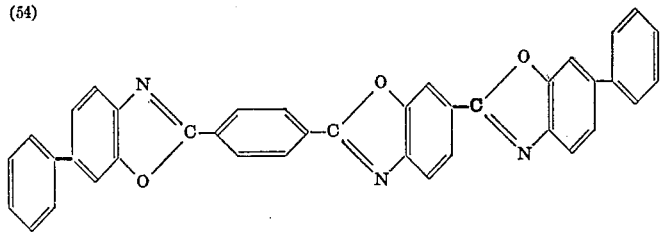

Greenish-light yellow crystalline powder from trichlorobenzene, melting at 345 to 346° C.

*Analysis.*—$C_{39}H_{23}N_3O_3$ (mol. weight 581.63). Calculated: C, 80.54%; H, 3.99%; N, 7.22%. Found: C, 80.04%; H, 3.97%; N, 7.26%.

(55)

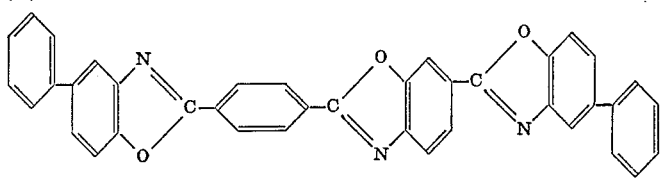

Greenish-light yellow crystalline powder from dichlorobenzene, melting at 317 to 318° C.

*Analysis.*—$C_{39}H_{23}N_3O_3$ (mol. weight 581.63). Calculated: C, 80.54%; H, 3.99%; N, 7.22%. Found: C, 81.32%; H, 4.15%; N, 6.85%.

(56)

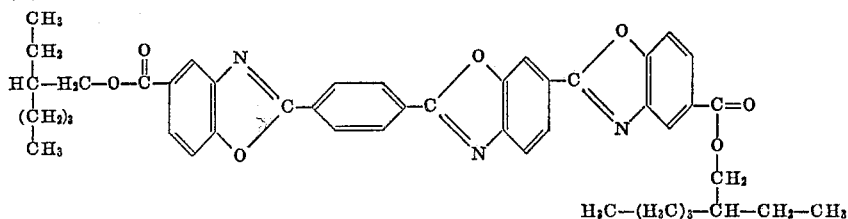

Light-yellow crystalline powder from toluene+cyclohexane, melting at 203 to 204° C.

*Analysis.*—$C_{45}H_{47}O_7N_3$ (mol. weight 741.89). Calculated: C, 72.85%; H, 6.39%; N, 5.66%. Found: C, 73.02%; H, 6.41%; N, 5.81%.

(57)

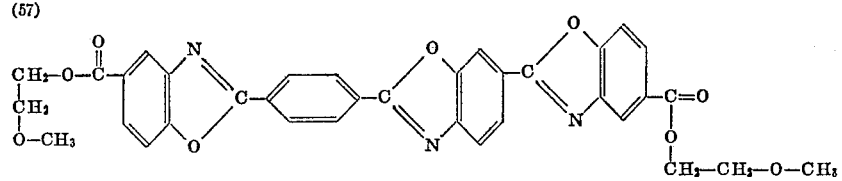

Light-yellow crystalline powder from dichlorobenzene, melting at 284 to 290° C. with decomposition.

*Analysis.*—$C_{35}H_{27}O_9N_3$ (mol. weight 633.79). Calculated: C, 66.35%; H, 4.30%; N, 6.63%. Found: C, 66.23%; H, 4.46%; N, 6.71%.

(58)

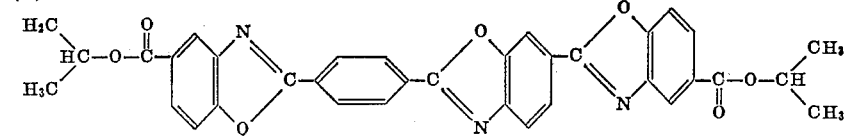

Greenish-light yellow crystalline powder from dimethylformamide, melting above 360° C.

*Analysis.*—$C_{35}H_{27}N_3O_7$ (mol. weight 601.59). Calculated: C, 69.87%; H, 4.52%; N, 6.99%. Found: C, 69.73%; H, 4.40%; N, 7.50%.

The dicarboxylic acid dichloride of the Formula 38 used as starting material can be prepared in the following manner:

198.6 parts of terephthalic acid monomethyl ester chloride are stirred with 167 parts of 4-amino-3-hydroxybenzoic acid methyl ester in 1000 parts by volume of anhydrous ortho-dichlorobenzene under nitrogen. The reaction mixture is slowly raised to the relux temperature, whereby at 140 to 150° C. a strong evolution of hydrochloric gas is caused. After refluxing for 4 hours, 1 part of boric anhydride is added and the solvent is slowly evaporated so that a dark melt forms which is still diluted with solvent. The temperature of the reaction mixture is slowly raised to 210 to 215° C. and stirred on at this temperature for one hour, with solvent partially distilling over as an azeotrope with the water of reaction. The reaction mixture is then cooled to 150° C., and 1000 parts by volume of dimethylformamide are slowly added. The batch is suctioned at room temperature and rinsed with methanol. After drying, there are obtained about 294 parts (=95% of theory) of the compound of the Formula 27

(27) 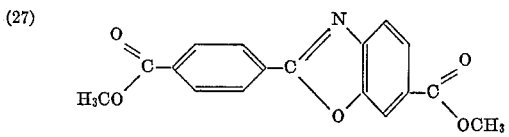

as a yellow crystalline powder which melts at 219 to 221° C. One recrystallization from dioxane with the aid of active carbon and bleaching earth furnishes very fine, colourless crystals melting at 220 to 221° C.

*Analysis.*—$C_{17}H_{13}O_5N$ (mol. weight 311.28). Calculated: C, 65.59%; H, 4.21%; N, 4.50%. Found: C, 65.33%; H, 4.19%; N, 4.40%.

A solution of 200 parts of sodium hydroxide pellets in 250 parts by volume of water is diluted with 3000 parts by volume of alcohol and heated to the reflux temperature, whereupon 584 parts of the dicarboxylic acid dimethyl ester of the Formula 27 are slowly stirred in. The reaction mixture is refluxed for another 2 hours, whereby a thick, light-yellow suspension is obtained. After suctioning and washing with alcohol the moist filter cake is dissolved in 2500 parts by volume of hot water and acidified by stirring in 300 parts by volume of concentrated hydrochloric acid. The white, crystalline percipitate is suctioned off and washed neutral with water. After drying there are obtained about 532 parts (=98% of theory) of the comfound of the formula

(59) 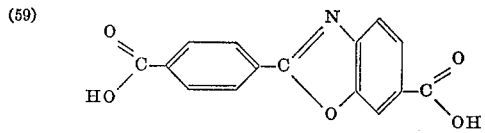

as a colourless powder melting above 350° C. Colourless, fine crystals from dimethylformamide, melting above 350° C.

*Analysis.*—$C_{15}H_9O_5N$ (mol. weight 283.23). Calculated. C, 63.61%; H, 3.20%; N, 4.95%. Found. C, 63.14%; H, 3.27%; N, 5.18%.

455 parts of the above dicarboxylic acid of the Formula 59 are suspended in 4000 parts by volume of chlorobenzene; 450 parts by volume of thionylchloride and 10 parts by volume of dimethylformamide are added, and the whole is refluxed and stirred for 2 hours, during which hydrochloric gas escapes. Another 450 parts by volume of thionylchloride and 10 parts by volume of dimethylformamide are then added and the mitxure is stirred on for 16 hours under reflux, whereupon a clear solution forms. The bulk of the solvent is distilled off under vacuum and hexane is added to the reaction mixture, which is then suctioned, the filter cake washed with hexane and dried, to yield about 393 parts (=77% of theory) of the dicarboxylic acid dichloride of the formula

(38) 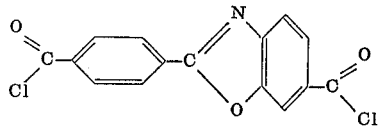

in the form of colourless, fine needles melting at 154 to 158° C. Colourless fine needles from ligroin, melting at 168° C.

*Analysis.*—$C_{15}H_7O_3NCl_2$ (mol. weight 320.13). Calculated. C, 56.28%; H, 2.20%; N, 4.38%; Cl, 22.15%. Found: C, 56.24%; H, 2.22%; N, 4.30%; Cl, 22.22%.

Example 2

18 parts of the carboxylic acid chloride of the formula

(60) 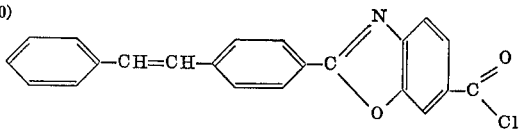

are stirred with 5.5 parts or ortho-aminophenol and 1 part by volume of pyridine in 150 parts by volume of anhydrous ortho-dichlorobenzene. The reaction mixture is then further processed as described in Example 1 for the compound of the Formula 39. Yield: about 16 parts (=79% of the theoretical) of the compound of the formula

(61) 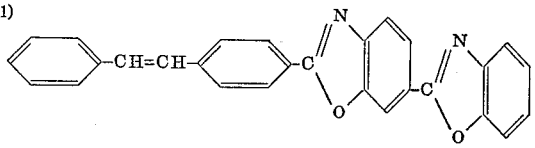

as a yellow, crystalline powder which melts at 207 to 210° C. Three recrystallizations from chlorobenzene with the aid of active carbon and bleaching earth furnish very fine, light-yellow crystals melting at 222 to 223° C. which display a strong fluorescence in ultraviolet light.

*Analysis.*—$C_{28}H_{18}N_2O_2$ (mol. weight 414.44). Calculated: C, 81.14%; H, 4.38%; N, 6.76%. Found: C, 80.88%; H, 4.31%; N, 6.98%.

In an analogous manner the corresponding aminophenols yield the following compounds:

(62) 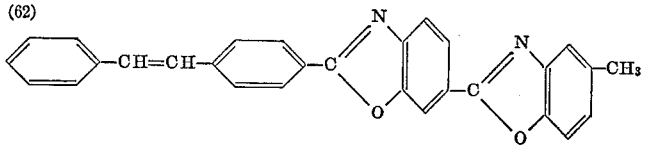

Light-yellow, finely crystalline powder from chlorebenzene, melting at 219 to 222° C.

*Analysis.*—C$_{29}$H$_{20}$N$_2$O$_2$ (mol. weight 428.47). Calculated C, 81.29%; H, 4.71%; N, 6.54%. Found: C, 81.15%; H, 4.69%; N, 6.68%.

(63) 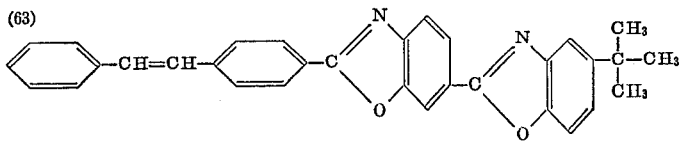

Colourless, fine crystals from dimethylformamide, melting at 224 to 226° C.
*Analysis.*—C$_{32}$H$_{26}$O$_2$N$_2$ (mol. weight 470.55). Calculated: C, 81.68%; H, 5.57%; N, 5.95%. Found: C. 81.60%; H, 5.61%; N, 6.05%.

(64) 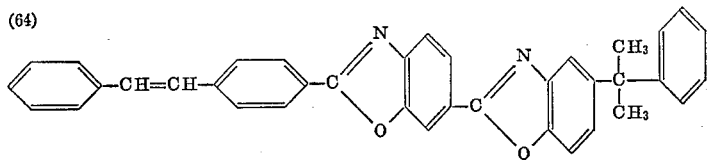

Pale-yellow, fine crystals from chlorobenzene, melting at 221 to 222° C.
*Analysis.*—C$_{37}$H$_{28}$O$_2$N$_2$ (mol. weight 532.61). Calculated: C, 83.43%; H, 5.30%; N, 5.26%. Found: C, 82.85%; H, 5.38%; N, 5.21%.

(65) 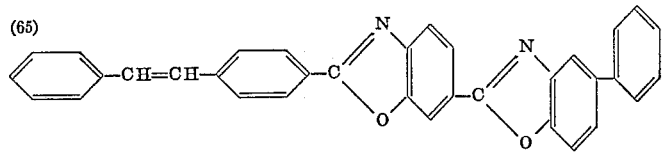

Pale greenish, very fine crystals from chlorobenzene, melting at 267 to 270° C.
*Analysis.*—C$_{34}$H$_{22}$N$_2$O$_2$ (mol. weight 490.53). Calculated: C, 83.24%; H, 4.52%; N, 5.71%. Found: C, 82.86%; H, 4.67%; N, 5.63%.

(66) 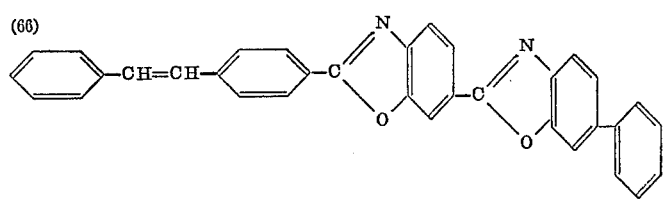

Pale greenish, very fine crystals from chlorobenzene, melting at 266 to 268° C.
*Analysis.*—C$_{34}$H$_{22}$N$_2$O$_2$ (mol. weight 490.53). Calculated: C, 83.24%; H, 4.52%; N, 5.71%. Found: C, 82.92%; H, 4.50%; N, 5.69%.

(67) 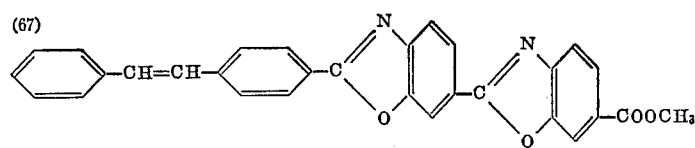

Light-yellow, finely crystalline powder from chlorobenzene, melting at 261 to 263° C.
*Analysis.*—C$_{30}$H$_{20}$N$_2$O$_4$ (mol. weight 472.48). Calculated: C, 76.26%; H, 4.27%; N, 5.93%. Found: C, 76.43%; H, 4.48%; N, 5.83%.

(68) 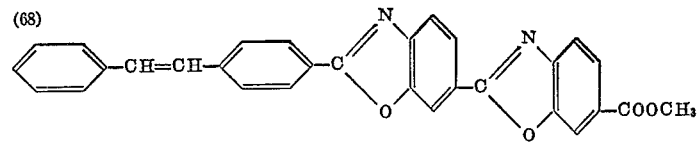

Light-yellow, finely crystalline powder from chlorobenzene, melting at 272 to 274° C.

*Analysis.*—C₃₀H₂₀N₂O₄ (mol. weight 472.48). Calculated: C, 76.26%; H, 4.27%; N, 5.93%. Found: C, 76.16%; H, 4.24%; N, 6.04%.

(69)

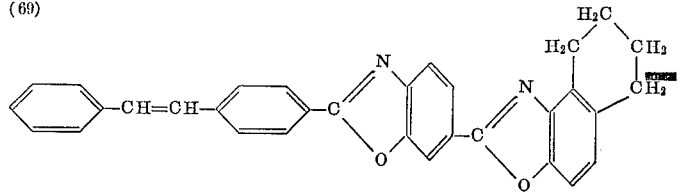

Colourless, fine crystals from dioxane, melting at 237 to 239° C.

*Analysis.*—C₃₂H₂₄N₂O₂ (mol. weight: 468.53). Calculated: C, 82.03%; H, 5.16%; N, 5.98%. Found: C, 81.23%; H, 5.15%; N, 5.69%.

The carboxylic acid chloride of the Formula 60 use as starting material can be prepared in the following manner:

48.4 parts of stilbene-4-carboxylic acid chloride are stirred with 33.4 parts of 4-amino-3-hydroxybenzoic acid methyl ester, 1 part by volume of pyridine and 350 parts by volume of anhydrous ortho-dichlorobenzene under nitrogen. The reaction mixture is then further processed as described in Example 1 for the compound of the Formula 27. Yield: about 67 parts (=95% of the theoretical) of the compound of the formula (70)

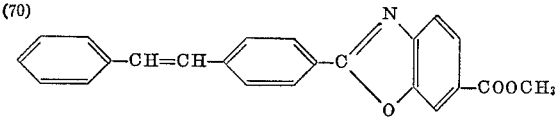

as a yellow, crystalline powder which melts at 207 to 210° C. One recrystallization from dimethylformamide with the aid of active carbon and beaching earth furnishes very fine colourless crystals melting at 208 to 210° C.

*Analysis.*—C₂₃H₁₇O₃N (mol. weight 355.37). Calculated: C, 77.73%; H, 4.82%; N, 3.94%. Found: C, 76.97%; H, 4.80%; N, 4.17%.

A solution of 20 parts of sodium hydroxide pellets in 50 parts by volume of water is diluted with 800 parts by volume of alcohol, and 53 parts of carboxylic acid methyl ester of the Formula 70 are slowly stirred in. The reaction mixture is further processed as described in Example 1 for the compound of the Formula 59, to yield about 50 parts (=98% of theory) of the compound of the formula (71)

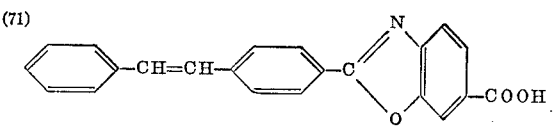

as a colourless powder which melts at 295 to 296° C. Colourless, fine crystals from dimethylformamide; melts at 298 to 300° C.

*Analysis.*—C₂₂H₁₅O₃N (mol. weight 341.35). Calculated: C, 77.40%; H, 4.43%; N, 4.10%. Found: C, 77.01%; H, 4.44%; N, 4.24%.

54 parts of the above carboxylic acid of the Formula 71 are suspended in 1500 parts by volume of chlorobenzene, and 300 parts by volume of thionylchloride and 6 parts by volume of dimethylformamide are added and the mixture is then further processed as described in Example 1 for the compound of the Formula 38.

Yield: about 49 parts (=86% of the theoretical) of the carboxylic acid chloride of the formula (60)

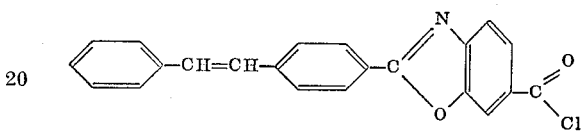

in the form of pale yellow, fine needles melting at 183 to 192° C. Pale yellow, fine needles from chlorobenzene + hexane, melting at 200 to 202° C.

*Analysis.*—C₂₂H₁₄O₂NCl (mol. weight 359.80). Calculated: C, 73.44%; H, 3.92%; N, 3.89%; Cl, 9.85%. Found: C, 73.15%; H, 3.90%; N, 4.15%; Cl, 9.64%.

Example 3

16.1 parts of the carboxylic acid chloride of the formula (72)

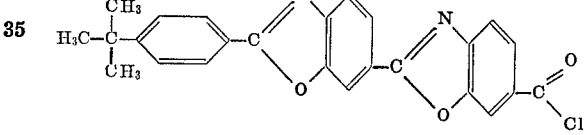

are stirred with 4.1 parts of ortho-aminophenol and 1 part by volume of pyridine in 200 parts by volume of anhydrous ortho-dichlorobenzene. The reaction mixture is then further processed as described in Example 1 for the compound of the Formula 39, to yield about 15 parts (=93% of theory) of the compound of the formula (73)

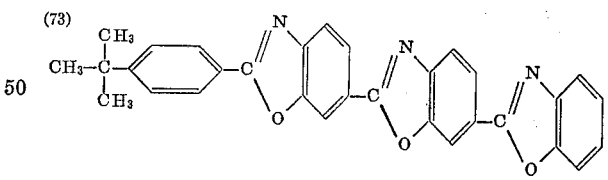

as a yellow, crystalline powder melting at 271 to 275° C. Two recrystallizations from chlorobenzene, while clarifying with active carbon and bleaching earth, furnish very fine, light-yellow crystals melting at 279 to 280° C. which display a blue fluorescence in ultraviolet light.

*Analysis.*—C₃₁H₂₃N₃O₃ (mol. weight 485.50). Calculated: C, 76.68%; H, 4.78%; N, 8.66%. Found: C, 76.56%; H, 4.58%; N, 8.61%.

In an analogous manner the corresponding aminophenols yield the following compounds:

(74)

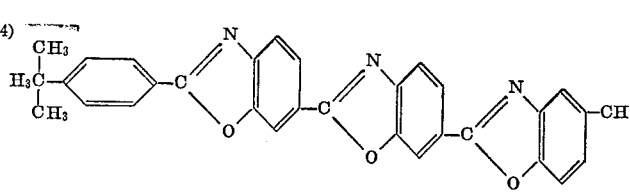

Light-yellow, finely crystalline powder from chlorobenzene, melting at 256 to 258° C.

*Analysis.*—$C_{32}H_{25}N_3O_3$ (mol. weight 499.53). Calculated: C, 76.93%; H, 5.94%; N, 8.41%. Found: C, 76.99%; H, 5.11%; N, 8.44%.

(75) 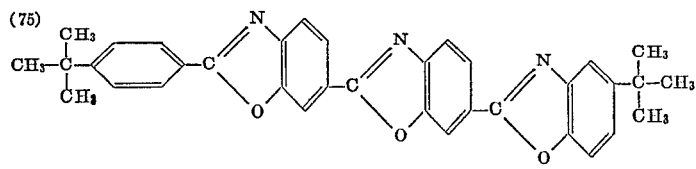

Colourless, crystals from chlorobenzene, melting at 250 to 268°C.

*Analysis.*—$C_{35}H_{31}N_3O_3$ (mol. weight 541.61). Calculated: C, 77.61%; H, 5.77%; N, 7.76%. Found: C, 77.52%; H, 5.48%; N, 7.96%.

(76) 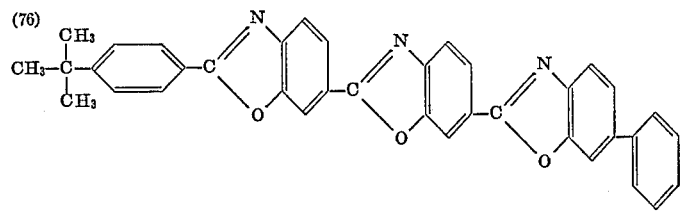

Faintly yellowish, very fine crystals from chlorobenzene, melting at 299 to 302°C.

*Analysis.*—$C_{37}H_{27}N_3O_3$ (mol. weight 561.60). Calculated: C, 79.12%; H, 4.85%; N, 7.48%. Found: C, 79.20%; H, 4.94%; N, 7.33%.

(77) 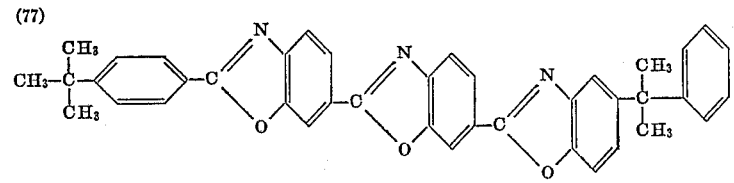

Colourless crystals from dioxane, melting at 222 to 226° C.

*Analysis.*—$C_{40}H_{33}N_3O_3$ (mol. weight 603.68). Calculated: C, 79.59%; H, 5.51%; N, 6.96%. Found: C, 79.16%; H, 5.44%; N, 6.96%.

(78) 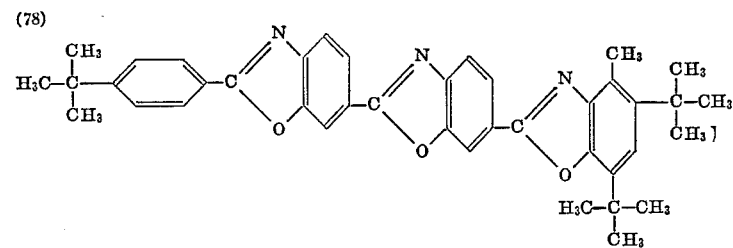

Colourless crystals from cyclohexane, melting at 269 to 270° C.

*Analysis.*—$C_{40}H_{41}O_3N_3$ (mol. weight 611.75). Calculated: C, 78.53%; H, 6.76%; N, 6.87%. Found: C, 78.31%; H, 6.79%; N, 6.98%.

(79) 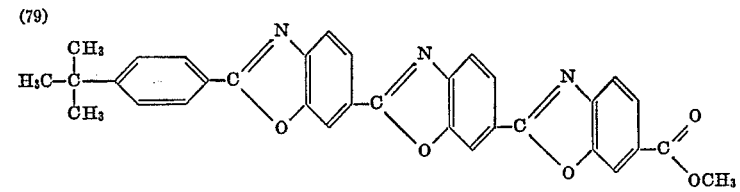

Fine, light-yellow needles from dichlorobenzene, melting at 295 to 299° C.

*Analysis.*—$C_{33}H_{25}N_3O_5$ (mol. weight 543.55). Calculated: C, 72.92%; H, 4.64%; N, 7.73%. Found: C, 73.00%; H, 4.65%; N, 7.77%.

The carboxylic acid chloride of the Formula 72 used as starting material can be prepared in the following manner:

197 parts of para-tertiary butylbenzoic acid chloride are stirred with 167 parts of 4-amino-3-hydroxybenzoic acid methyl ester, 1 part of volume of pyridine and 1000 parts by volume of ortho-dichlorobenzene under nitrogen, and the reaction mixture is further processed as described in Example 1 for the compound of the Formula 27, to yield about 277 parts (=90% of theory) of the compound of the formula

(80) 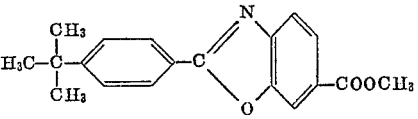

as a white, crystalline powder which melts at 123 to 125° C. Small, white needles from methanol+methylene-chloride melting at 129 to 130° C.

*Analysis.*—$C_{19}H_{19}O_3N$ (mol. weight 309.35). Calculated: C, 73.76%; H, 6.19%; N, 4.53%. Found: C, 73.56%; H, 6.01%; N, 4.71%.

A solution of 50 parts of sodium hydroxide pellets in 100 parts by volume of water is diluted with 2000 parts by volume of alcohol and heated to the reflux temperature. 263 parts of the carboxylic acid ester of the Formula 80 are slowly stirred in, and the reaction mixture is further processed as described in Example 1 for the compound of the Formula 59. Yield: about 220 parts (=76% of the theoretical) of the compound of the formula (81)

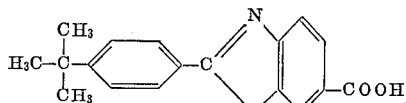

in the form of a colourless powder melting at 247 to 253° C. Colourless, fine crystals from chlorobenzene, melting at 259 to 262° C.

Analysis.—$C_{18}H_{17}O_3N$ (mol. weight 295.33). Calculated: C, 73.20%; H, 5.80%; N, 4.74%. Found: C, 73.56%; H, 6.01%, N, 4.71%.

215 parts of the above carboxylic acid of the Formula 81 are suspended in 2000 parts by volume of chlorobenzene; 300 parts by volume of thionyl chloride and 6 parts by volume of dimethylformamide are added, and the reaction mixture is further processed, all as described in Example 1 for the compound of the Formula 38. Yield: about 206 parts (=90% of the theoretical) of the carboxylic acid chloride of the formula (82)

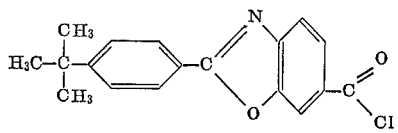

in the form of faintly yellowish, fine needles, melting at 132 to 133° C. Colourles, fine needles from hexane, melting at 135 to 136° C.

Analysis.—$C_{18}H_{16}NO_2Cl$ (mol. weight 313.77). Calculated: C, 68.90%; H, 5.14%; N, 4.46; Cl, 11.30%. Found: C, 68.84%; H, 4.93%; N, 4.44%; Cl, 11.44%.

206 parts of the above carboxylic acid chloride of the Formula 82 are stirred with 110 parts of 4-amino-3-hydroxy-benzoic acid methyl ester, 1 part by volume of pyridine and 1000 parts by volume of ortho-dichlorobenzene under nitrogen, and the reaction mixture is then further processed as described in Example 1 for the compound of the Formula 38. Yield: about 256 parts (=91.5% of the theoretical) of the compound of the formula (83)

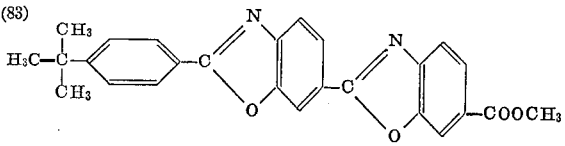

in the form of a colourless, crystalline powder melting at 184 to 187° C. Small, white needles from chlorobenzene+methanol, melting at 201 to 203° C.

Analysis.—$C_{26}H_{22}N_2O_4$ (mol. weight 426.45). Calculated: C, 73.22%; H, 5.20%; N, 6.57%. Found: C, 73.35%; H, 5.48%; N, 6.52%.

30 parts of sodium hydroxide pellets are dissolved in 100 parts by volume of water, diluted with 4000 parts by volume of alcohol and heated to reflux, whereupon 202 parts of the carboxylic acid ester of the Formula 83 are slowly stirred in. The reaction mixture is further processed as described in Example 1 for the compound of the Formula 59. Yield: about 180 parts (=92% of the theoretical) of the compound of the formula (84)

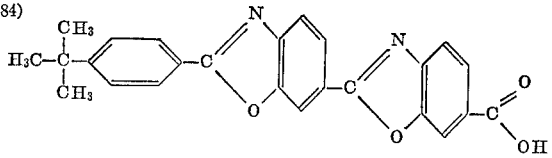

as a colourless powder melting at 310 to 315° C. Colourless, fine crystals from dimethylformamide+alcohol, melting at 312 to 313° C.

Analysis.—$C_{25}H_{20}N_2O_4$ (mol. weight 414.43). Calculated: C, 72.80%; H, 4.89%; N, 6.79%. Found: C, 72.97%; H, 5.05%; N, 6.63%.

195 parts of the above carboxylic acid of the Formula 84 are suspended in 2000 parts by volume of chlorobenzene, and 300 parts by volume of thionylchloride and 6 parts by volume of dimethylformamide are added and the reaction mixture is further processed, all as described in Example 1 for the compound of the Formula 38. Yield: about 171 parts (=84% of the theoretical) of the carboxylic acid chloride of the formula (72)

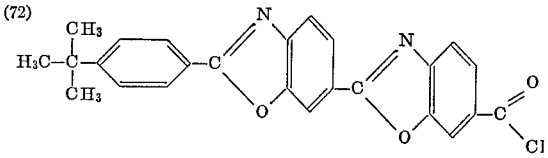

as a faintly yellowish, crystalline powder which melts at 235 to 237° C. Pale-yellow, fine needles from chlorobenzene, melting at 239 to 240° C.

Analysis.—$C_{25}H_{19}N_2O_3Cl$ (mol. weight 430.88). Calculated: C, 69.69%; H, 4.44%; N, 6.50%. Found: C, 69.75%; H, 4.43%; N, 6.60%.

Example 4

14.2 parts of the carboxylic acid chloride of the formula (85)

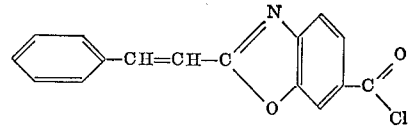

are stirred with 5.5 parts of ortho-aminophenol and 1 part by volume of pyridine in 200 parts by volume of anhydrous ortho-dichlorobenzene, and the reaction mixture is further processed as described in Example 1 for the compound of the Formula 39. Yield: about 12 parts (=71% of the theoretical) of the compound of the formula (86)

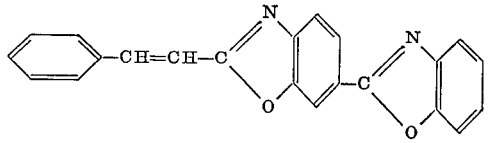

as a yellow, crystalline powder which melts at 168 to 173° C. Two recrystallizations from chlorobenzene and clarification with active carbon and bleaching earth furnish very fine, light-yellow crystals melting at 196 to 200° C., which fluoresce strongly in ultraviolet light.

Analysis.—$C_{22}H_{14}N_2O_2$ (mol. weight 338.35). Calculated: C, 78.09%; H, 4.17%; N, 8.28%. Found: C, 77.15%; H, 3.87%; N, 8.45%.

In an analogous manner the corresponding aminophenols yield the following compounds:

(87)

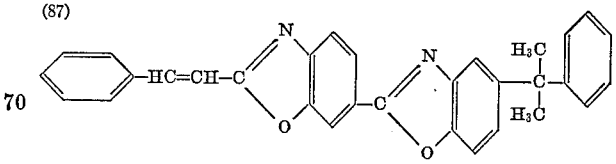

Light-yellow, finely crystalline powder from dioxane, melting at 174 to 176° C.

*Analysis.*—C₃₁H₂₄N₂O₂ (mol. weight 456.52). Calculated: C, 81.55%; H, 5.30%; N, 6.14% Found: C, 81.23%; H, 5.46%; N, 6.25%.

(88)
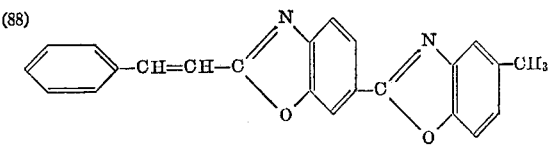

Pale-yellow, very fine crystals from chlorobenzene, melting at 175 to 177° C.

*Analysis.*—C₂₃H₁₆N₂O₂ (mol. weight 352.38). Calculated: C, 78.39%; H, 4.58%; N, 7.95% Found: C, 78.19%; H, 4.53%; N, 7.87%.

(89)
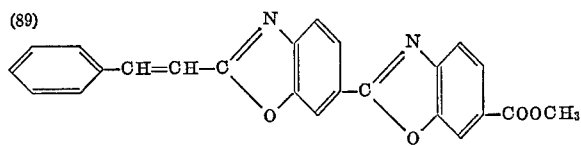

Greenish light-yellow, crystalline powder from chlorobenzene, melting at 198 to 200° C.

*Analysis.*—C₂₄H₁₆N₂O₄ (mol. weight 396.39). Calculated: C, 72.72%; H, 4.07%; N, 7.07% Found: C, 72.66%; H, 4.01%; N, 7.33%.

In an analogous manner the acid chloride of the formula

(90)
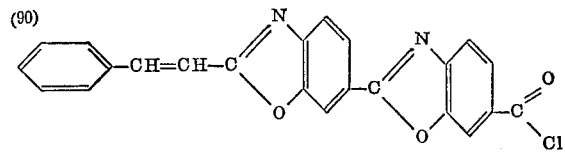

yields the compound of the formula

(91)
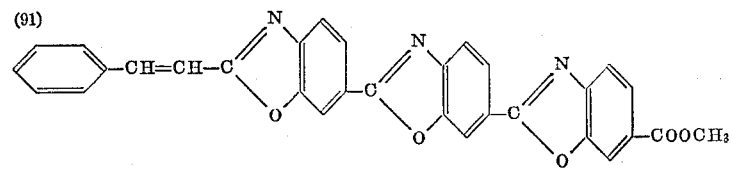

as a yellow, crystalline powder which melts at 265 to 269° C. Fine yellow needles from ortho-dichlorobenzene, melting at 265 to 267° C.

*Analysis.*—C₃₁H₁₉N₃O₅ (mol. weight 513.48). Calculated: C, 72.51%; H, 3.73%; N, 8.18% Found: C, 71.76%; H, 3.67%; N, 8.36%.

The carboxylic acid chloride of the Formulae 85 and 90 can be prepared in the following manner:

166.6 parts of cinnamic acid chloride are stirred with 167 parts of 4-amino-3-hydroxybenzoic acid methyl ester, 1 part by volume of pyridine and 1000 parts by volume of ortho-dichlorobenzene under nitrogen, and the reaction mixture is then further processed as described in Example 1 for the compound of the Formula 27, to yield about 211 parts (=76% of theory) of the compound of the formula

(92)
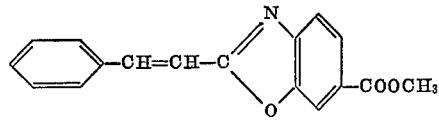

in the form of a colorless, crystalline powder which melts at 111 to 113° C. Fine, colourless needles from alcohol, melting at 114 to 115° C.

*Analysis.*—C₁₇H₁₃NO₃ (mol. weight 279.28). Calculated: C, 73.11%; H, 4.69%; N, 5.02%. Found: C, 73.12%; H, 4.71%; N, 5.05%.

56 parts of sodium hydroxide pellets are dissolved in 100 parts by volume of water, diluted with 3000 parts by volume of alcohol and heated to the reflux temperature, whereupon 200 parts of the carboxylic acid ester of the Formula 92 are slowly stirred in. The reaction mixture is then further processed as described in Example 1 for the compound of the Formula 59. Yield: about 184 parts (=97% of the theoretical) of the compound of the formula

(93)
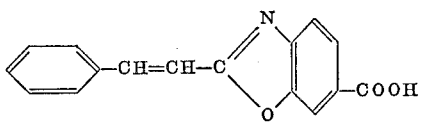

as a colourless powder which melts at 216 to 220° C. Fine, colourless crystals from chlorobenzene, melting at 221 to 224° C.

*Analysis.*—C₁₆H₁₁NO₃ (mol. weight 265.26). Calculated: C, 72.44%; H, 4.18%; N, 5.28%. Found: C, 72.21%; H, 4.19%; N, 5.21%.

In an analogous manner the carboxylic acid methyl ester of the Formula 89 yields the carboxylic acid of the formula

(94)
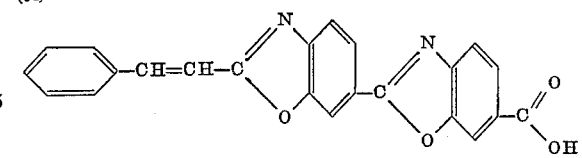

as a yellow powder melting at 332 to 336° C. Fine, yellow crystals from ortho-dichlorobenzene, melting at 342 to 344° C.

*Analysis.*—C₂₃H₁₄N₂O₄ (mol. weight 382.39). Calculated: C, 72.24%; H, 3.69%; N, 7.33%. Found: C, 72.06%; H, 3.80%; N, 7.56%.

A suspension of 182 parts of the above carboxylic acid of the Formula 93 in 2000 parts by volume of chlorobenzene is mixed with 300 parts by volume of thionylchloride and 6 parts by volume of dimethylformamide and the reaction mixture is then further worked up, all as described for the compound of the Formula 38 in Example 1. Yield: about 192 parts (=98% of the theoretical) of the carboxylic acid chloride of the formula

(85)
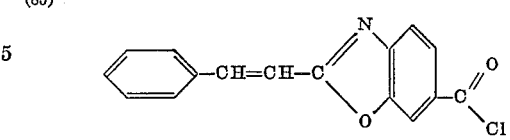

as a faintly yellow, crystalline powder melting at 161 to 164° C. Pale yellow, fine needles from chlorobenzene, melting at 164 to 166° C.

*Analysis.*—C₁₆H₁₀NO₂Cl (mol. weight 283.71). Calculated: C, 67.72%; H, 3.56%; Cl, 12.50%. Found: C, 67.62%; H, 3.51%; Cl, 12.79%.

In an analogous manner the carboxylic acid of the Formula 94 yields the carboxylic acid chloride of the formula (90)

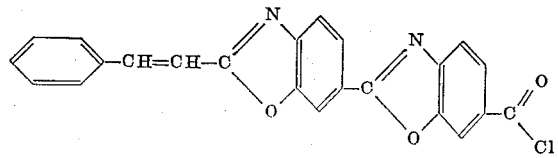

as a yellow, crystalline powder which melts at 165 to 168° C. Fine, yellow needles from chlorobenzene, melting at 170 to 172° C.

Analysis.—$C_{23}H_{13}N_2O_3Cl$ (mol. weight 400.81). Calculated: C, 68.92%; H, 3.27%; N, 6.99%; Cl, 8.85%. Found: C, 68.64%; H, 3.21%; N, 7.22%; Cl, 8.50%.

Example 5

17 parts of the carboxylic acid chloride of the formula (95)

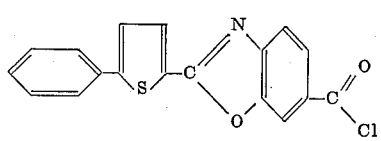

are stirred with 5.5 parts of ortho-aminophenol and 1 part by volume of pyridine in 200 parts by volume of anhydrous ortho-dichlorobenzene, and the reaction mixture is then further processed as described in Example 1 for the compound of the Formula 39. Yield: about 18.5 parts (=94% of the theoretical) of the compound of the formula (96)

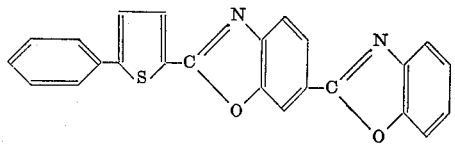

as a yellow crystalline powder melting at 232 to 234° C. After two recrystallizations from chlorobenzene very fine, light-yellow crystals melting at 235 to 236° C. are obtained which fluoresce strongly in ultraviolet light.

Analysis.—$C_{24}H_{14}SN_2O_2$ (mol. weight 394.43). Calculated: C, 73.08%; H, 3.58%; N, 7.10%. Found: C, 73.21%; H, 3.67%; N, 7.17%.

In an analogous manner the corresponding aminophenols yield the following compounds:

(97)

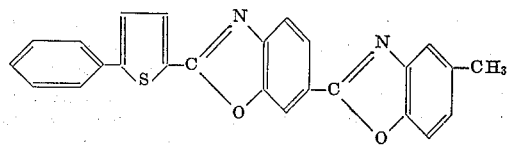

Light-yellow, finely crystalline powder from chlorobenzene, melting at 245 to 247° C.

Analysis.—$C_{25}H_{16}SN_2O_2$ (mol. weight 408.46). Calculated: C, 73.51%; H, 3.95%; N, 6.86%. Found: C, 73.73%; H, 4.05%; N, 6.92%.

(98)

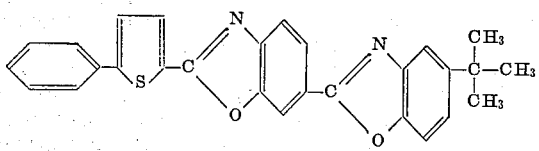

Pale-yellow crystals from chlorobenzene, melting at 245 to 246° C.

Analysis.—$C_{28}H_{22}N_2O_2S$ (mol. weight 450.54). Calculated: C, 74.64%; H, 4.92%; N, 6.22%. Found: C, 74.48%; H, 4.99%; N, 6.13%.

(99)

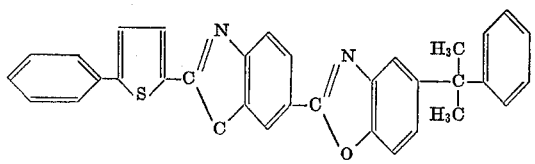

Pale yellow crystals from chlorobenzene, melting at 240 to 241° C.

Analysis.—$C_{33}H_{24}N_2O_2S$ (mol. weight 512.60). Calculated: C, 77.32%; H, 4.72%; N, 5.46%. Found: C, 77.07%; H, 4.82%; N, 5.49%.

(100)

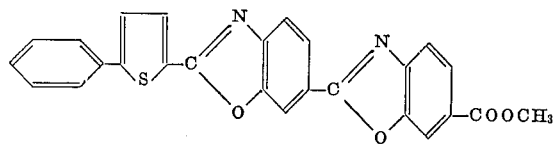

Yellow crystals from chlorobenzene, melting at 246 to 248° C.

Analysis.—$C_{26}H_{16}N_2O_4S$ (mol. weight 452.47). Calculated: C, 69.02%; H, 3.56%; N, 6.19%; S, 7.09%. Found: C, 68.93%; H, 3.50%; N, 6.41%; S, 6.92%.

(101)

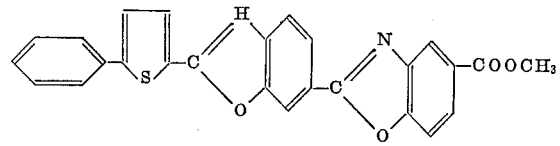

Yellow crystals from chlorobenzene, melting at 287 to 289° C.

Analysis.—$C_{26}H_{16}N_2O_4S$ (mol. weight 452.47). Calculated: C, 69.02%; H, 3.56%; N, 6.19%. Found: C, 69.08%; H, 3.70%; N, 6.35%.

The carboxylic acid chloride of the Formula 95 used as starting material can be prepared in the following manner:

33.4 parts of phenylthiophene carboxylic acid chloride are stirred with 25 parts of 4-amino-3-hydroxy-benzoic acid methyl ester, 1 part by volume of pyridine and 500 parts by volume of ortho-dichlorobenzene under nitrogen, and the reaction mixture is then further processed as described in Example 1 for the compound of the Formula 39. Yield: about 40 parts (=78.5% of the theoretical) of the compound of the formula (102)

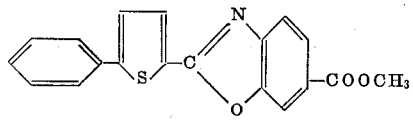

as a yellow, crystalline powder which melts at 200 to 201° C. Pale yellow, small needles from dioxane, melting at 203 to 204° C.

Analysis.—$C_{19}H_{13}O_3NS$ (mol. weight: 355.38). Calculated: C, 68.04%; H, 3.91%; N, 4.18%. Found: C, 68.24%; H, 3.87%; N, 4.17%.

A solution of 16 parts of sodium hydroxide pellets in 40 parts by volume of water is diluted with 800 parts of ethanol and heated to the reflux temperature, and 26.3 parts of the carboxylic acid ester of the Formula 102 are slowly stirred in. The reaction mixture is then further processed as described in Example 1 for the compound of the Formula 59. Yield: about 24 parts (=94.5% of the theoretical) of the compound of the formula (103)
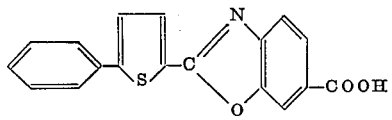
—COOH as a colourless powder which melts at 280 to 285° C. Colourless crystals from dimethylformamide, melting at 287 to 288° C.

Analysis.—$C_{18}H_{11}NO_3S$ (mol. weight: 321.30). Calculated: C, 67.28%; H, 3.45%; N, 4.36%. Found: C, 66.80%; H, 3.47%; N, 4.58%.

22.3 parts of the above carboxylic acid of the Formula 103 are suspended in 750 parts by volume of chlorobenzene, and 150 parts by volume of thionylchloride and 4 parts by volume of dimethylformamide are added and the reaction mixture is further processed, all as described in Example 1 for the compound of the Formula 38. Yield: about 20 parts (=83.5% of the theoretical) of the carboxylic acid chloride of the formula

(95)
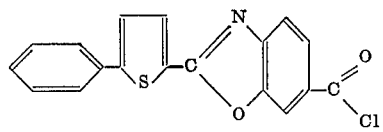

Pale yellow, fine needles from chlorobenzene, melting at 199 to 200° C.

Analysis.—$C_{18}H_{10}O_2NSCl$ (mol. weight: 339.80). Calculated: C, 63.63%; H, 2.97%; N, 4.12%; Cl, 10.43%. Found: C, 63.58%; H, 2.99%; N, 4.01%; Cl, 10.47%.

Example 6

A mixture of 12.0 parts of the compound of the formula (104)
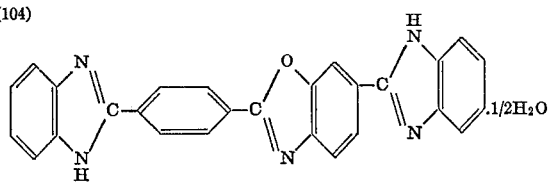
.1/2H$_2$O and 4 parts of 1,3-bis-dimethylaminobutane in 50 parts by volume of acrylonitrile is stirred for 24 hours under reflux. The reaction mixture is then cooled to room temperature, and 100 parts by volume of alcohol are run into the thickly liquid yellow suspension which is then suctioned tained very fine yellow needles melting above 360° C. which fluoresce strongly in ultraviolet light.

Analysis.—$C_{30}H_{20}N_6O$ (mol. weight: 480.51). Calculated: C, 74.98%; H, 4.20%; N, 17.49%. Found: C, 75.53%; H, 4.23%; 16.67%.

The compound of the Formula 104 used as starting material can be prepared in the following manner:

A mixture of 28.3 parts of the dicarboxylic acid of the Formula 59, 21.6 parts of ortho-phenylene-diamine and 209 parts of polyphosphoric acid is stirred for 18 hours at 165 to 170° C. under nitrogen. The reaction mixture is cooled to 100° C., and 1000 parts by volume of water are run into the thickly liquid green melt which is then suctioned at room temperature and rinsed with water. The filter cake is slurried with a mixture of 500 parts by volume of alcohol and 500 parts by volume of water, heated to the reflux temperature and 100 parts by volume of sodium hydroxide solution of 30% strength, are slowly added, whereby a dark solution is obtained. After clarification with active carbon and bleaching earth a clear, yellow solution is obtained which is neutralized to pH=7 with concentrated hydrochloric acid. The precipitate formed is suctioned off, washed with water and dried, to yield about 38 parts (=89% of theory) of the compound of the Formula 104 in the form of a light-yellow powder which melts above 360° C. After two recrystallizations from alcohol with the aid of active carbon and bleaching earth there are obtained very fine, light-yellow crystals melting above 360° C. which fluoresce strongly in ultraviolet light.

Analysis.—$C_{27}H_{17}N_5O$. ½ $H_2O$ (mol. weight 436.45). Calculated: C, 74.30%; H, 4.15%; N, 16.05%. Found: C, 74.58%; H, 4.11%; N, 16.16%.

Example 7

6.5 parts of the dicarboxylic acid dichloride of the formula (106)
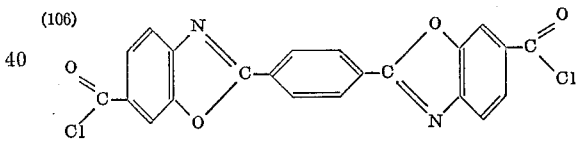

are stirred with 5 parts of 2-amino-4-tertiary butylphenol and 1 part by volume of pyridine in 150 parts by volume of anhydrous ortho-dichlorobenzene, and the reaction mixture is then further processed as described in Example 1 for the compound of the Formula 39. Yield: about 5.8 parts (=59% of the theoretical) of the compound of the formula (107)
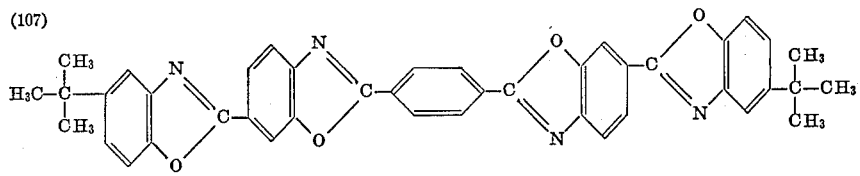

filtered and the filter residue is rinsed with alcohol. After drying there are obtained about 8.2 parts (=62% of theory) of the compound of the formula (105)
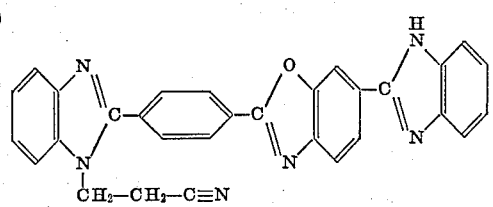

in the form of a yellow powder which melts above 300° C. After two recrystallizations from alcohol and clarification with active carbon and bleaching earth there are obtained as a yellow powder melting above 340° C. After two recrystallizations from dichlorobenzene with the aid of active carbon and bleaching earth there are obtained light-yellow crystals melting above 340° C. which fluoresce strongly in ultraviolet light.

Analysis.—$C_{42}H_{34}O_4N_4$ (mol. weight: 658.72). Calculated: C, 76.58%; H, 5.20%; N, 8.51%. Found: C, 76.39%; H, 5.34%; N, 8.38%.

The dicarboxylic acid dichloride of the Formula 106 used as starting material can be prepared thus:

4.06 parts of terephthalic acid dichloride are stirred with 7.24 parts of 4-amino-3-hydroxybenzoic acid ethyl ester, 1 part by volume of pyridine and 100 parts by volume of ortho-dichlorobenzene under nitrogen, and the reaction mixture is then further processed as described in Example 1 for the compound of the Formula 39. Yield:

about 8 parts (=88% of the theoretical) of the compound of the formula (108)
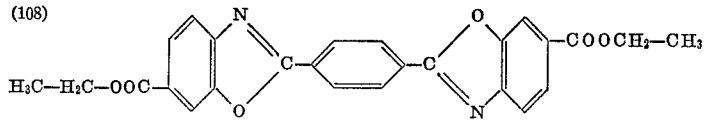

in the form of colourless crystals melting at 250 to 255° C. After two recrystallizations from dimethylformamide there are obtained colourless crystals which melt at 260 to 261° C. and fluoresce strongly in ultraviolet light.

*Analysis.*—$C_{26}H_{20}O_6N_2$ (mole. weight 456.44). Calculated: C, 68.41%; H, 4.42%; N, 6.14%. Found: C, 68.71%; H, 4.49%; N, 6.31%.

A solution of 20 parts of sodium hydroxide pellets in 50 parts by volume of water is diluted with 450 parts by volume of alcohol and heated to the reflux temperature. 31 parts of the dicarboxylic acid diethyl ester of the Formula 108 are then slowly stirred in, and the reaction mixture is further processed as described in Example 1 for the compound of the Formula 59. Yield: about 21 parts (=77% of the theoretical) of the compound of the formula (109)
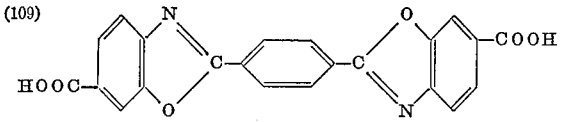

as a colourless powder melting above 350° C.

19.9 parts of the above carboxylic acid of the Formula 109 are suspended in 200 parts by volume of chlorobenzene, whereupon 50 parts by volume of thionylchloride and 2 parts by volume of dimethylformamide are added and the reaction mixture is further processed, all as described in Example 1 for the compound of the Formula 38. Yield: about 20 parts (=92% of the theoretical) of the dicarboxylic acid dichloride of the formula (106)
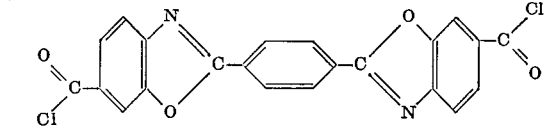

in the form of a pale-yellow, crystalline powder which melts at 255 to 265° C.

Example 8

100 parts of polypropylene are rolled to and fro on a calendar heated at 130° C. to form a homogeneous foil, and 0.02 part of one of the compound of the formula 43, 47, or 55 is slowly incorporated with this foil. As soon as the optical brigtener has been evenly dispersed in the foil, the latter is pulled off the calender and pressed on a resin press at 130 to 135° C. to form panels.

In each of the three tests a strong brightening effect is achieved. Similar brightening effects can also be obtained with high-pressure polyethylene.

Example 9

100 parts of polyester granulate from polyterephthalic acid ethyleneglycol ester are intimately mixed on a suction filter with 0.01 part of the compound of the Formula 47 and melted at 285° C. with stirring. When this spinning melt is spun through conventional spinnerets, substantially brightened polyester fibres are obtained.

If desired, the compound of the Formula 47 may alternatively be added to the starting materials before or during the polycondensation that furnishes the polyester.

Similar brightening effects are achieved when the compound of the Formula 47 is replaced by the compound of the Formula 67 or 61.

Example 10

10,000 parts of a polyamide in chip form, prepared in known manner from hexamethylenediamine adipate, are mixed for 12 hours in a tumbler with 30 parts of titanium dioxide (rutile modification) and 2 parts of the compound of the Formula 43 or 63 or 39. The chips treated in this manner are melted in a boiler from which the atmospheric oxygen has been expelled with superheated steam and which is heated with oil or diphenyl vapour at 300 to 310° C., and the melt is stirred for half an hour, then expressed through a spinneret under a nitrogen pressure of 5 atmospheres (gauge), and the resulting, cooled filament is reeled on a spinning bobbin. The filaments obtained in this manner display an excellent brightening effect which is stable towards heat-setting and good fastness to washing and light.

Example 11

10,000 parts of a polyamide in chip form, prepared in known manner from ε-caprolactam, are mixed for 12 hours in a tumbler with 30 parts of titanium dioxide (rutile modification) and 2 parts of the compound of the Formula 43 or 63. The chips treated in this manner are melted in a boiler from which the atmospheric oxygen has been expelled and which is heated at 270° C., and the melt is stirred for half an hour, then expressed through a spinneret under a nitrogen pressure of 5 atmospheres (gauge), and the cooled filament is reeled on a spinning bobbin. The filaments obtained in this manner display an excellent brightening effect which is stable towards heat-setting and good fastness to washing and light.

Example 12

A polyester (for example "Dacron") fabric is padded at room temperature (about 20° C.) with an aqueous dispersion containing per litre 2 g. of the compound of the Formula 31 or 32 as well as 1 g. of an adduct from about 8 mols of ethylene oxide with 1 mol of para-tertiary octylphenol, and then dried at about 100° C. The dry material is then exposed to dry heat of 150 to 220° C. for 2 minutes to a few seconds depending on the temperature used. The material treated in this manner has a significantly better white aspect than the untreated material.

What is claimed is:
1. The oxazole of the formula

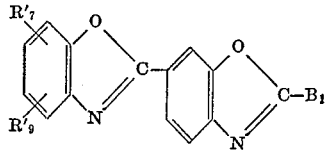

where $B_1'$ represents a member selected from the following group of formulae

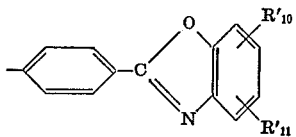

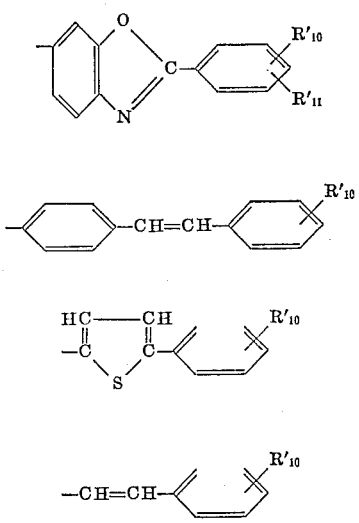

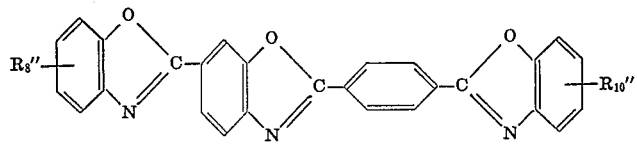

and R₃' to R₁₁' each represents a substituent selected from the group consisting of hydrogen, chlorine, an alkyl group containing 1 to 12 carbon atoms, a phenyl group, a tetrahydronaphthyl group, an alkylphenyl group containing 1 to 4 carbon atoms in the alkyl residue, a cyanoalkyl group containing 1 to 4 carbon atoms, a carboxylic acid group and an alkyl carboxylic acid ester group whose ester grouping contains 1 to 8 carbon atoms.

2. An oxazole compound of the formula

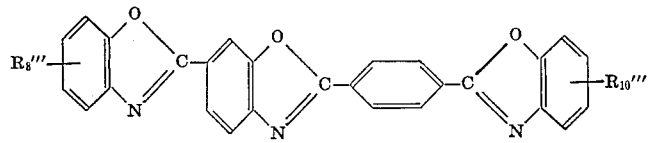

wherein $R_8''$ and $R_{10}''$ each stands for an alkyl group containing from 1 to 12 carbon atoms.

3. An oxazole compound of the formula

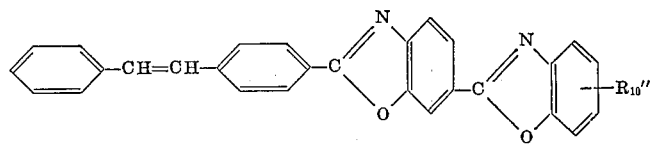

wherein $R_8'''$ and $R_{10}'''$ each stands for a carboxylic acid alkyl ester group containing from 1 to 8 carbon atoms in the alkyl ester group.

4. An oxazole compound of the formula

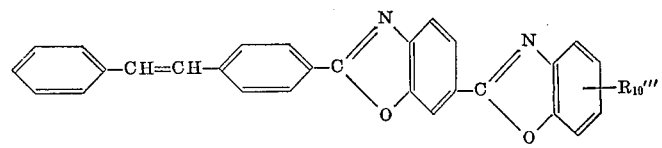

wherein $R_{10}''$ stands for an alkyl group containing from 1 to 12 carbon atoms.

5. An oxazole compound of the formula

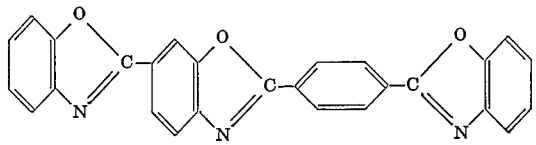

wherein $R_{10}'''$ stands for a carboxylic acid alkyl ester group containing from 1 to 8 carbon atoms in the alkyl ester group.

6. An oxazole compound of the formula

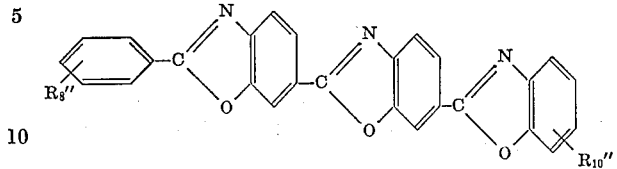

wherein $R_8''$ and $R_{10}''$ each stands for an alkyl group containing from 1 to 12 carbon atoms.

7. An oxazole compound of the formula

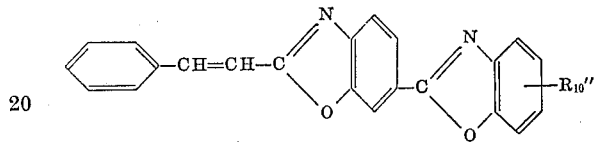

wherein $R_{10}''$ stands for an alkyl group containing from 1 to 12 carbon atoms.

8. The oxazole compound of the formula

9. The oxazole compound of the formula

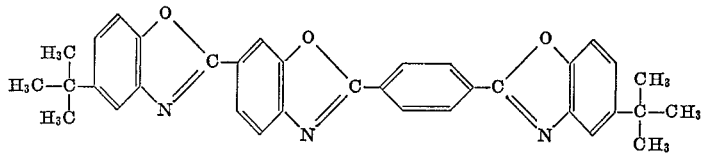

10. The oxazole compound of the formula

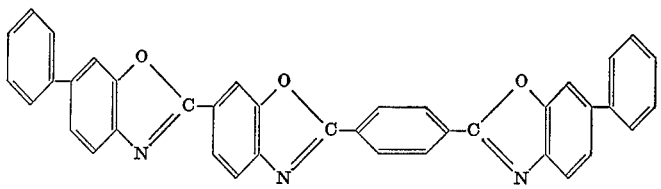

11. The oxazole compound of the formula

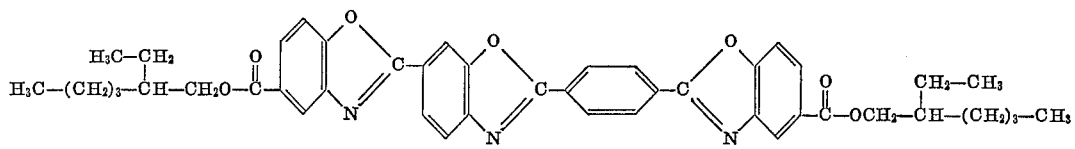

12. The oxazole compound of the formula

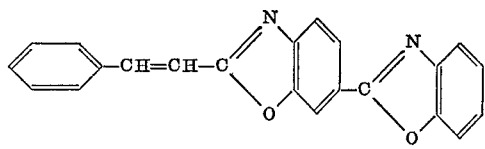

13. The oxazole compound of the formula

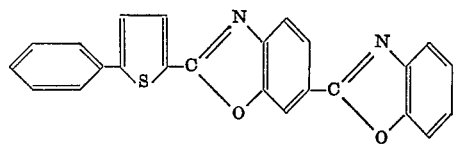

14. The oxazole compound of the formula

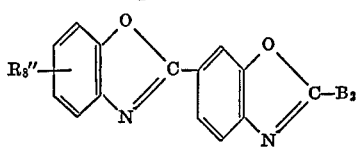

where $B_2$ represents a member selected from the group consisting of

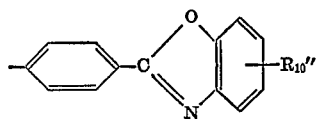

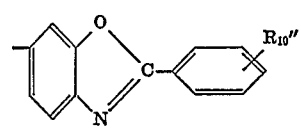

and

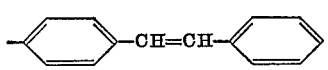

and $R_8''$ and $R_{10}''$ each stands for hydrogen, an alkyl group containing from 1 to 12 carbon atoms, a carboxylic alkyl ester group containing from 1 to 8 carbon atoms in the alkyl ester group or a phenyl group.

15. An oxazole compound of the formula

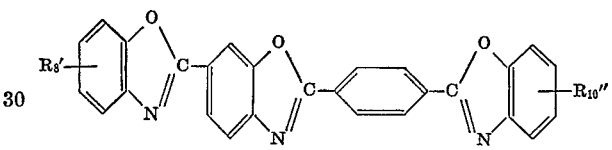

wherein $R_8'$ and $R_{10}'$ each stands for hydrogen, an alkyl group containing from 1 to 12 carbon atoms, a carboxylic acid alkyl ester group containing from 1 to 8 carbon atoms in the alkyl ester group or a phenyl group.

16. The compound of the formula

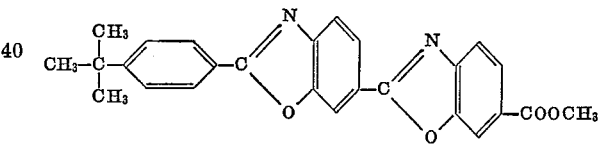

17. The compound of the formula

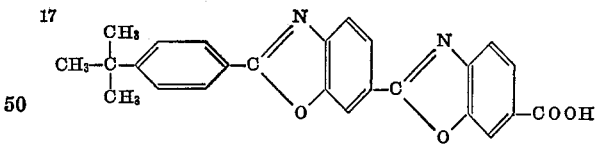

References Cited

UNITED STATES PATENTS 2,704,286  3/1955  Baum _____ 260—304
3,095,422  6/1963  Duennenberger et al. __ 260—240

OTHER REFERENCES

Chemical Abstracts: vol. 58, cols. 13931 to 13932 (1863) (abstract of Kirprianov et al.).

JOHN A. RANDOLPH, *Primary Examiner.*

U.S. Cl. X.R.

8—65, 73; 96—1.6, 104; 106—176, 288; 117—33.5; 252—89, 117, 152, 301.2; 260—37, 240.1, 249.5, 304, 307, 544, 559

CASE 5511/5514/R/E

PO-1050
(5/69)

UNITED STATES PATENT OFFICE
CERTIFICATE OF CORRECTION

Patent No. 3,449,330      Dated June 10, 1969

Inventor(s) LEONARDO GUGLIELMETTI ET AL

It is certified that error appears in the above-identified patent and that said Letters Patent are hereby corrected as shown below:

Column 38, line 60, amend the left-hand portion of the formula to read:

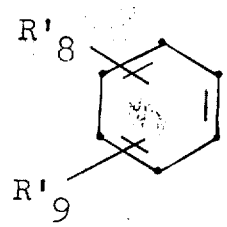

Column 39, line 15, amend the right-hand portion of the formula to read:

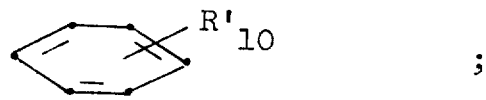 ;

line 20, amend the right-hand portion of the formula to read:

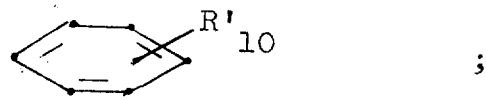 ;

line 25, "$R_3'$" should read --- $R_8'$ --- line 31, "alkyl carboxylic acid ester" should read --- carboxylic acid alkyl ester ---.

SIGNED AND
SEALED
JAN 26 1971

(SEAL)
Attest:

Edward M. Fletcher, Jr.
Attesting Officer

WILLIAM E. SCHUYLER, JR.
Commissioner of Patents